(12) United States Patent
Mellet et al.

(10) Patent No.: US 12,152,657 B2
(45) Date of Patent: Nov. 26, 2024

(54) COMPACT TRANSMISSION SYSTEMS AND VEHICLES

(71) Applicant: GM GLOBAL TECHNOLOGY OPERATIONS LLC, Detroit, MI (US)

(72) Inventors: Edward W Mellet, Rochester Hills, MI (US); Peter Beller, West Bloomfield, MI (US); Mazharul Chowdhury, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/295,318

(22) Filed: Apr. 4, 2023

(65) Prior Publication Data

US 2024/0337306 A1    Oct. 10, 2024

(51) Int. Cl.
*F16H 3/44*    (2006.01)
(52) U.S. Cl.
CPC ....... *F16H 3/44* (2013.01); *F16H 2200/2005* (2013.01); *F16H 2200/203* (2013.01)
(58) Field of Classification Search
CPC ............... F16H 3/44; F16H 2200/2005; F16H 2200/203; F16H 2200/2035
See application file for complete search history.

(56) References Cited

U.S. PATENT DOCUMENTS

| | | | | |
|---|---|---|---|---|
| 4,660,439 | A * | 4/1987 | Hiraiwa | F16H 3/663 475/284 |
| 2013/0138306 | A1* | 5/2013 | Schultz | B60K 6/12 701/51 |
| 2021/0024053 | A1* | 1/2021 | Kasahara | F16H 3/72 |
| 2021/0054910 | A1* | 2/2021 | Hwang | B60L 15/2054 |
| 2021/0260982 | A1* | 8/2021 | Akiyama | B60K 17/346 |

* cited by examiner

*Primary Examiner* — Jacob S. Scott
*Assistant Examiner* — Farhana Pervin
(74) *Attorney, Agent, or Firm* — Lorenz & Kopf LLP

(57) ABSTRACT

Compact transmission systems and vehicles with such transmission systems are provided. An exemplary compact transmission includes a drive shaft defining a drive axis and configured to be powered by a drive unit; a planetary gearset having a ring gear member, a planet gear member, a sun gear member, and a planet carrier having a carrier shaft defining a planetary axis, wherein the planetary axis is distanced from the drive axis; an output shaft defining an output axis, wherein the output axis is distanced from the planetary axis and from the drive axis; an output gear connected to the output shaft; a drive pinion gear configured to transfer torque from the drive shaft to the planetary gearset; and an output pinion gear configured to transfer torque from the planetary gearset to the output shaft.

11 Claims, 10 Drawing Sheets

COMPACT TRANSMISSION SYSTEMS AND VEHICLES

The present disclosure relates to transmission system for vehicles, and more particularly relates to compact transmission systems.

Passenger vehicles include a powertrain that is comprised of a drive unit such as an electric motor, a transmission system, and a differential or final drive. The transmission system may increase the overall operating range of the vehicle by permitting the drive unit to operate through its torque range.

With the advent of three- and four-speed automatic transmissions for combustion engine vehicles, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

While conventional transmissions achieve their intended purpose, the need for new and improved transmission configurations continues with the design of lighter and more compact vehicles, particularly for vehicles driven by electric motors. Accordingly, it is desirable to provide a cost-effective, compact and multi-speed transmission. Furthermore, other desirable features and characteristics of the present disclosure will become apparent from the subsequent detailed description and the appended claims, taken in conjunction with the accompanying drawings and the foregoing technical field and background.

SUMMARY

Compact transmission systems and vehicles with such transmission systems are provided. An exemplary compact transmission includes a drive shaft defining a drive axis and configured to be powered by a drive unit; a planetary gearset having a ring gear member, a planet gear member, a sun gear member, and a planet carrier having a carrier shaft defining a planetary axis, wherein the planetary axis is distanced from the drive axis; an output shaft defining an output axis, wherein the output axis is distanced from the planetary axis and from the drive axis; an output gear connected to the output shaft; a drive pinion gear configured to transfer torque from the drive shaft to the planetary gearset; and an output pinion gear configured to transfer torque from the planetary gearset to the output shaft.

In certain embodiments, the drive pinion gear is configured to transfer torque from the drive shaft to the ring gear member of the planetary gearset; and the output pinion gear is configured to transfer torque from the carrier shaft to the output gear. In certain embodiments, the transmission further includes a carrier-sun synchronizing clutch configured to selectively connect the planet carrier to the sun gear member. In certain embodiments, the transmission further includes a ring-sun synchronizing clutch configured to selectively connect the ring gear member to the sun gear member. In certain embodiments, the transmission further includes a sun-ground clutch configured to selectively connect the sun gear member to a ground element. In certain embodiments of the transmission, the drive pinion gear meshes directly with the ring gear member of the planetary gearset. In certain embodiments, the transmission further includes a ring-transfer gear interconnected between the drive pinion gear and the ring gear member of the planetary gearset. In certain embodiments of the transmission, the planetary gearset is a simple planetary gearset; the drive pinion gear rotates about the drive axis in a drive plane; the ring-transfer gear rotates about the planetary axis in the drive plane; the ring gear member, the planet gear member, and the sun gear member rotate or revolve around the planetary axis in a planetary plane; the output pinion gear rotates about the planetary axis in an output plane; and the output plane is located between the drive plane and the planetary plane.

In certain embodiments of the transmission, the drive pinion gear is configured to transfer torque from the drive shaft directly to the ring gear member of the planetary gearset; the output pinion gear is configured to transfer torque directly from the carrier shaft to the output gear; and the compact transmission further includes a differential interconnecting the output gear and the output shaft; a sun-ground clutch configured to selectively connect the sun gear member to a ground element; and a carrier-sun clutch configured to selectively connect the planet carrier to the sun gear member.

In certain embodiments of the transmission, the drive pinion gear is configured to transfer torque from the drive shaft to the ring gear member of the planetary gearset; the output pinion gear is configured to transfer torque from the carrier shaft to the output gear; and the sun gear member includes a sun gear shaft configured to be powered by a second drive unit. In certain embodiments, the transmission further includes a ring-ground clutch configured to selectively connect the ring gear member to a first ground element; and a sun-ground clutch configured to selectively connect the sun gear member to a second ground element.

In certain embodiments, the transmission further includes a second shaft defining a second axis and configured to be powered by a second gear, wherein the second axis is distanced from the output axis, from the planetary axis, and from the drive axis, and wherein the drive pinion gear is configured to transfer torque from the drive shaft to the second gear; and a second output pinion gear configured to transfer torque from the second shaft to the output gear. In certain embodiments, the transmission further includes a second gear clutch configured to selectively connect the second gear to the second shaft.

In certain embodiments of the transmission, the drive pinion gear is configured to transfer torque from the drive shaft to the sun gear member of the planetary gearset; and the output pinion gear is configured to transfer torque from the carrier shaft to the output gear. In certain embodiments, the transmission further includes a ring-ground clutch configured to selectively connect the ring gear member to a ground element, and a ring-sun clutch configured to selectively connect the ring gear member to the sun gear member. In certain embodiments, the transmission further includes a sun-transfer gear and a sun-transfer shaft, wherein the sun-transfer shaft interconnects the sun-transfer gear and the sun gear member, and wherein the drive pinion gear meshes directly with the sun-transfer gear. In certain embodiments of the transmission, the sun-transfer gear rotates about the planetary axis; the output pinion gear rotates about the planetary axis; and the sun-transfer gear is located between the output pinion gear and the sun gear member.

In another embodiment, a vehicle is provided and includes a drive unit; a drive shaft configured to be powered by the drive unit; a drive pinion gear coupled to the drive shaft; a planetary gearset having a ring gear member, a planet gear member, a sun gear member, and a planet carrier, wherein the drive pinion gear is configured to transfer torque from the drive shaft to the planetary gearset; an output shaft, wherein the planetary gearset is configured to transfer torque from the drive pinion gear to the output shaft; and a carrier-sun clutch synchronizing clutch configured to selectively connect the planet carrier to the sun gear member.

In another embodiment, a vehicle is provided and includes a drive unit; a drive shaft defining a drive axis and configured to be powered by the drive unit; a drive pinion gear coupled to the drive shaft; a planetary gearset having a ring gear member, a planet gear member, a sun gear member, and a planet carrier and defining a planetary axis distanced from the drive axis, wherein the drive pinion gear is configured to transfer torque from the drive shaft to the planetary gearset; and an output shaft defining an output axis, wherein the output axis is distanced from the planetary axis and from the drive axis, and wherein the planetary gearset is configured to transfer torque from the drive pinion gear to the output shaft. In certain embodiments, the vehicle further includes a carrier-sun clutch synchronizing clutch configured to selectively connect the planet carrier to the sun gear member.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DESCRIPTION OF THE DRAWINGS

The present disclosure will hereinafter be described in conjunction with the following drawing figures, wherein like numerals denote like elements, and wherein.

DETAILED DESCRIPTION

Figure 1:
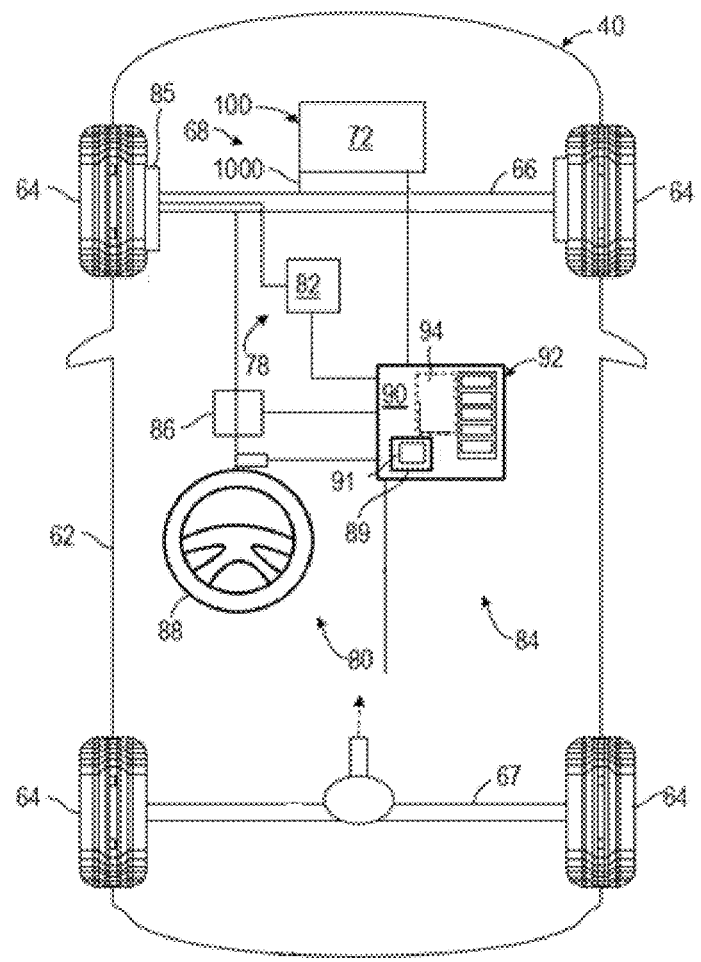
FIG. 1 is a functional block diagram of a vehicle, in accordance with exemplary embodiments.

The following detailed description is merely exemplary in nature and is not intended to limit the application and uses. Furthermore, there is no intention to be bound by any expressed or implied theory presented in the preceding introduction, brief summary or the following detailed description. As used herein, the term module refers to any hardware, software, firmware, electronic control unit or component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of automated driving systems including cruise control systems, automated driver assistance systems and autonomous driving systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Various connections, such as between a driving gear and a driven gear, and between a gear and an axial shaft or sleeve, are described herein. In exemplary embodiments, a connected driving gear and driven gear mesh with one another. Specifically, each gear has cut gear teeth, and the cut gear teeth mate with one another such that the driving gear may directly contact, engage with, and drive the driven gear. Thus, the connection therebetween is provided between the cut gear teeth. In exemplary embodiments, a gear that is coupled to an axial shaft or sleeve is directly fixed to the axial shaft or sleeve, such the gear and shaft or sleeve rotate together.

Planetary gearsets are provided in certain embodiments. In an exemplary embodiment, the planetary gearset is a simple planetary gearset. For example, the planetary gearset has only one set of pinion gears.

Referring to FIG. 1, a vehicle 40 is illustrated in functional block diagram form. In various embodiments, the vehicle 40 is an automobile. The vehicle 40 may be any one of a number of different types of automobiles, such as, for example, a sedan, a wagon, a van, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 40 may also include another type of mobile platform.

As depicted in FIG. 1, the vehicle 40 includes a body 62 that is arranged on or integrated with a chassis. The body 62 substantially encloses other components of the vehicle 40. The vehicle 40 also includes a plurality of wheels 64. The wheels 64 are each rotationally coupled to the chassis near a respective corner of the body 62 to facilitate movement of the vehicle 40. In one embodiment, the vehicle 40 includes four wheels 64, although this may vary in other embodiments (for example for trucks and certain other vehicles).

A drive system 68 is mounted in the vehicle 40, and drives the wheels 64, for example via axles 66, 67. In certain embodiments, the drive system 68 includes a propulsion system 72. In certain exemplary embodiments, the propulsion system 72 includes a powerplant or drive unit 100, such as an internal combustion engine and/or an electric motor/generator, that is coupled with a transmission system 1000. In certain embodiments, the drive system 68 may vary, and/or two or more drive systems 68 may be used. By way of example, the vehicle 40 may also incorporate any one of, or combination of, a number of different types of drive units 100, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, the vehicle 40 also includes a braking system 78 and a steering system 80 in various embodiments. In exemplary embodiments, the braking system 78 controls braking of the vehicle 40 using an actuator 82 that may be controlled via inputs provided by a driver, such as through a brake pedal as the actuator 82, and in certain embodiments, via automatic control by a control system 84. The braking system 78 incudes brakes, such as brake 85, at any of the number of wheels 64. Also in exemplary embodiments, the steering system 80 controls steering of the vehicle 40 via an actuator 86, such as with inputs from a steering wheel 88 (e.g., in connection with a steering column coupled to the axle 66 and/or the wheels 64), that are controlled via inputs provided by a driver, and in certain embodiments via automatic control via the control system 84.

In the embodiment depicted in FIG. 1, the control system 84 is coupled with various systems including the braking system 78 and the steering system 80 of the vehicle 40. In various embodiments, the control system 84 may also be coupled to one or more other systems and/or components of the vehicle 40 and includes a controller 90. As illustrated in FIG. 1, the controller 90, and the powertrain controller 89 are a part of, or comprise, a computer system 92. It will be appreciated that the controller 90 may otherwise differ from the example depicted in FIG. 1. The controller 90 may be configured as any number of controllers and/or microcontrollers in communication with each other.

As illustrated in FIG. 1, the controller 90 is coupled with various devices and systems of the vehicle 40, such as the braking system 78 and the steering system 80. The controller 90 may accept information from various sources, process that information, and provide control commands based thereon to effect outcomes such as operation of the vehicle 40 and its systems, including of the braking system 78. In the depicted embodiment, the controller 90 includes a processor 94 including a memory device and storage device. The processor 94 performs the computation and control functions of the controller 90, and may be any type of processor or multiple processors, single integrated circuits such as a microprocessor, or any suitable number of integrated circuit devices and/or circuit boards working in cooperation to accomplish the functions of a processing unit. During operation, the processor 94 may execute one or more programs and may use data, each of which may be stored within the processor 94, the processor 94 controls the general operation of the controller 90 in executing the processes described herein, such as the processes and methods described in greater detail below.

The controller 90 is coupled with various actuators including the actuators 82, 86 and the propulsion system 72. The controller 90 is also coupled with various sensors that sense observable conditions of the vehicle 40. In this embodiment, the sensing devices include, but are not limited to, a braking sensor such as a pedal position sensor, a steering angle sensor, an acceleration sensor, and a torque request sensor, such as at the accelerator pedal or throttle.

In various embodiments, the controller 90 is coupled to, among other devices, the sensors, the braking system 78, the steering system 80, the propulsion system 72, and/or one or more other systems, devices, and/or components of the vehicle 40.

The controller 90 may provide the propulsion system 72 control functions of the vehicle 40. In embodiments, a powertrain controller 89 may be coupled in the control system 84 and in certain embodiments may be included in the controller 90. In embodiments, the powertrain control module 91 may reside in, or may comprise, the powertrain controller 89, which may be a part of the controller 90 or which may be a separate powertrain controller 89 coupled with the controller 90. The powertrain controller 89 may provide the various functions of controlling the propulsion system 72, such as by providing a torque command to operate the propulsion system 72 to propel the vehicle 40.

Figure 2:
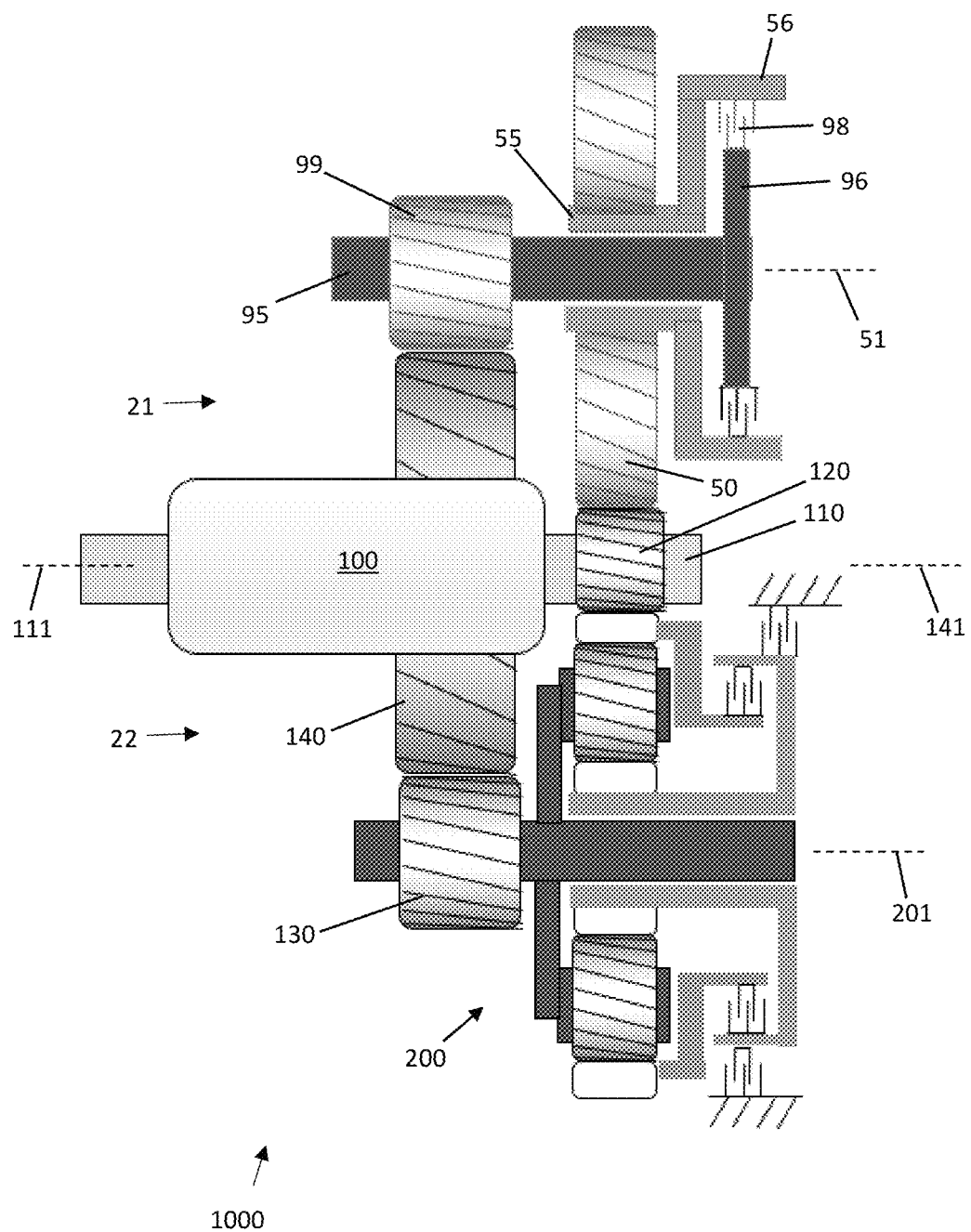
FIG. 2 is an overhead schematic of a transmission system for the vehicle of FIG. 1, in accordance with exemplary embodiments.

In FIG. 2, an exemplary transmission system 1000 is illustrated. The transmission system 1000 is configured to transmit power received from a drive unit 100 to the wheels 64 (shown in FIG. 1) according to selectable speed ratios. The drive unit 100 may, in various embodiments, include an internal combustion engine, an electric machine such as a traction motor, and/or a fuel cell propulsion system.

Figure 3:
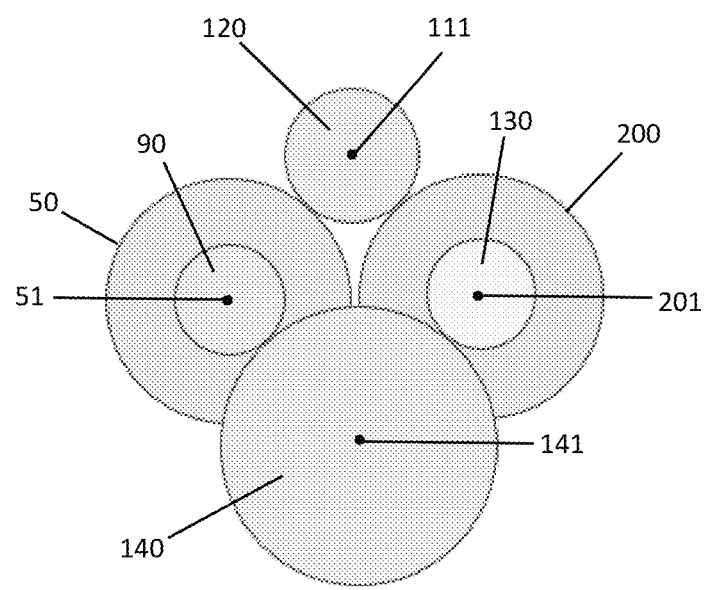
FIG. 3 is an end view schematic of the transmission system of FIG. 2.

FIG. 2 is an overhead schematic. As a result, certain features lie below and are partially hidden by other features in FIG. 2. FIG. 3 is an end view schematic that provides clarity regarding the layout of the features of the transmission system 1000.

Cross-referencing FIGS. 2 and 3, the transmission system 1000 provides two torque paths 20 from a drive unit 100 to an output gear 140. Each torque path 21 and 22 is configured to transfer torque from a drive pinion gear 120 that is coupled to a drive shaft 110 that is configured to be driven by the drive unit 100. As shown, the drive shaft 110 and drive pinion gear 120 rotate about drive axis 111.

In torque path 21, a transfer gear 50 rotatable about an axis 51 is connected to the drive pinion gear 120. As shown, the transfer gear 50 is selectively connected to an output pinion gear 99, which is also rotatable about the axis 51. The output pinion gear 99 is connected to the output gear 140. As shown, output gear 140 is rotatable about axis 141.

In torque path 21, the output pinion gear 99 is coupled to and includes or is disposed on an output shaft 95. Further, the output pinion gear 99 includes a radially-outward extending frame 96 coupled to the output shaft 95. Further, the transfer gear 50 is coupled to and includes a transfer sleeve 55 that surrounds the output shaft 95 for rotation about axis 51. The transfer gear 50 further includes an axially-extending barrel 56 connected to the transfer sleeve 55.

As shown, in torque path 21, the transmission system 1000 includes a clutch 98 that selectively connects and selectively disconnects the transfer gear 50 and the output pinion gear 99 from one another. As a result, when clutch 98 is open (selectively disconnecting), then no torque may be transferred from the drive unit 100 to the output gear 140 through torque path 21. When clutch 98 is closed (selectively connecting), torque may be transferred from the drive unit 100 to the output gear 140 through torque path 21.

As shown in FIG. 3, axis 51, axis 111, axis 141, and axis 201 are all distanced from or offset from one another, i.e., none of the axes 51, 111, 141, and 201 are co-linear with one another and at least two of the axes 51, 111, 141, and 201 are not coplanar.

Figure 4:
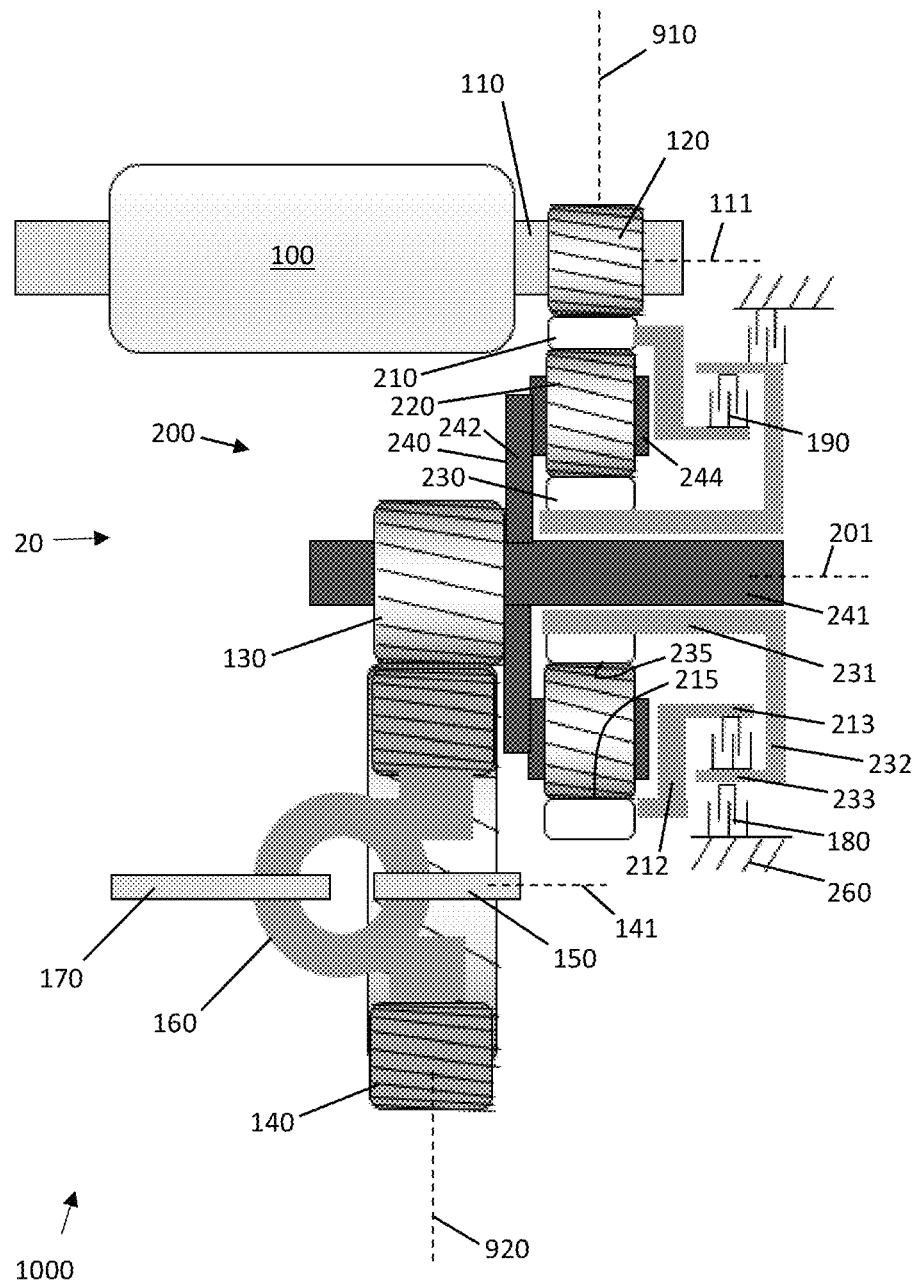
FIGS. 4-10 are schematic views of alternate or additional transmission systems or portions of transmission systems for use in the vehicle of FIG. 1, in accordance with exemplary embodiments.

FIG. 4 illustrates the components of the transmission system in torque path 22. The transmission system 1000 of torque path 22 in FIG. 4 may be referred to as a 3-axis, 2-speed transmission system. It is noted that FIGS. 4-10 depict the output gear 140 and axis 141 schematically as being adjacent to the output pinion gear 130 in the plane of the drawing sheet, rather than under the drive unit 100 in a plane below the drawing sheet as intended and shown in FIG. 2. This is for purposes of clarity and ease of illustration only.

Cross-referencing FIGS. 2-4, the drive pinion gear 120 is configured to transfer torque from the drive shaft 110 to the planetary gearset 200 described below.

As shown, the transmission system 1000 includes a planetary gearset 200 having a ring gear member 210, a planet gear member 220, a sun gear member 230, and a planet carrier 240 defining a planetary axis 201. As shown, the planetary axis 201 is distanced from or offset from, i.e., not co-linear with, the drive axis 111. Rather, in exemplary embodiments, the planetary axis 201 is parallel to the drive axis 111.

Each planet gear member 220 is rotatably mounted to the planet carrier 240 via a respective planet axle 244. As shown, the planet carrier 240 includes a carrier shaft 241 that extends along axis 201. Further, the planet carrier 240 includes a brace member 242 that extends laterally, i.e., in a direction perpendicular to the planetary axis 201, from the carrier shaft 241 to planet axles 244. The planet carrier 240 is configured to rotate about the planetary axis 201.

The exemplary sun gear member 230 includes an annular axial sleeve 231 that surrounds the carrier shaft 241 for rotation about axis 201, a radially-outward-extending frame 232, and an outer annular lip 233, as shown.

The ring gear member 210 is provided with a structure including a radially-inward-extending shoulder 212 and an axially-extending annular barrel 213.

In the planetary gearset 200, the ring gear member 210, the sun gear member 230, and the planet carrier 240 are configured to rotate about the planetary axis 201, and the planet gear members 220 are configured to revolve about the planetary axis 201. Further, the ring gear member 210 is formed as an annular wall with cut gear teeth along an inner surface 215, and the sun gear member 230 is provided with cut gear teeth along an outer surface 235. Planet gear members 220 are rotatably mounted on the planet carrier 240 and are located between the inner surface 215 of the ring gear member 210 and the outer surface 235 of the sun gear member 230 in meshing relationship with both the sun gear member 230 and the ring gear member 210.

In the embodiment of FIGS. 2-4, the ring gear member 210 is configured to transfer torque to the planet gear members 220. While the cross-sectional views the Figures herein illustrate two separate planet gear members 220, the transmission system 1000 includes three to ten planet gear members 220 in exemplary embodiments. Revolution of the planet gear members 220 about the axis 201 causes rotation of the planet carrier 240 about the axis 201.

As shown, the transmission system 1000 includes an output pinion gear 130 configured to transfer torque from the planetary gearset 200 to an output as described below. The output pinion gear 130 is configured for rotation about the planetary axis 201. In exemplary embodiments, the output pinion gear 130 is coupled to the carrier shaft 241.

The exemplary transmission system 1000 further includes an output gear 140 and output gear shaft 150 defining an output axis 141. As shown, the output axis 141 is distanced from or offset from, i.e., not co-linear with the axes 111 and 201. Thus, the transmission system 1000 includes three axes. In exemplary embodiments, the output gear 140 is coupled to the output gear shaft 150.

In exemplary embodiments, the transmission system 1000 further includes an output shaft 170 and a differential 160 interconnecting the output gear 140 and/or shaft 150 and the output shaft 170. In exemplary embodiments, the output shaft 170 is rotatable about the output axis 141. As a result, the output gear 140 may power the output shaft 170. Specifically, torque communicated from the output pinion gear 130 to the output gear 140 causes the output gear 140 and output gear shaft 150 to rotate about the output axis 141, and such torque is selectively communicated to the output shaft 170 through the differential 160.

As described, in the transmission system 1000 of FIGS. 2-4, the drive pinion gear 120 is configured to transfer torque along torque path 22 from the drive shaft 110 to the planetary gearset 200, and the output pinion gear 130 is configured to transfer torque from the planetary gearset 200 to the output shaft 170. More specifically, the drive pinion gear 120 is configured to transfer torque from the drive shaft 110 to the ring gear member 210 of the planetary gearset 200, and the output pinion gear 130 is configured to transfer torque from the planet carrier 240 of the planetary gearset 200 to the output pinion gear 130.

In exemplary embodiments, the drive pinion gear 120 directly meshes with the ring gear member 210. The ring gear member 210 transfers torque from the drive pinion gear 120 to the planet gear members 220, causing the planet gear members 220 to revolve around the axis 201 (when the sun gear member 230 is locked in static configuration by the sun-ground clutch 180 described below). As a result, the planet carrier 240, the carrier shaft 241, and the output pinion gear 130 rotate about the axis 201. The output pinion gear 130 directly meshes with the output gear 140, transferring torque from the planetary gearset 200 to the output gear 140. The output gear 140 then transfers torque from the output pinion gear 130 to the output shaft 170 through the differential 160.

As shown in FIG. 4, the drive pinion gear 120 rotates about the drive axis 111 in a plane 910 perpendicular to the drive axis 111. Further, the gear members 210, 220, and 230 rotate or revolve about the planetary axis 201 and in the same plane 910, perpendicular to the planetary axis 201. As further shown the output pinion gear 130 rotates about the planetary axis 201 in an output plane 920 distanced from the plane 910. In the illustrated embodiment, the output gear 140 rotates about the axis 141 and in the output plane 920. The torque path 22 of transmission system 1000 of FIG. 4 includes two gear planes, plane 910 and plane 920.

In torque path 22, the transmission system 1000 includes a ground clutch 180. Specifically, the ground clutch 180 is a sun-ground clutch configured to selectively connect, and disconnect, the sun gear member 230 to/from a ground element 260. As shown, the sun-ground clutch 180 selectively connects and disconnects the outer annular lip 233 of the sun gear member 230 to/from the ground element 260, such as by selectively locking one or more clutch plates via an actuator.

In exemplary embodiments, the transmission system 1000 further includes a synchronizing clutch 190. Specifically, the illustrated synchronizing clutch 190 is a ring-sun synchronizing clutch configured to selectively connect, and disconnect, the ring gear member 210 to/from the sun gear member 230. As shown, the ring-sun synchronizing clutch 190 selectively connects and disconnects the axially-extending annular barrel 213 of the ring gear member 210 to/from the sun gear member 230. Specifically, the ring-sun synchronizing clutch 190 selectively connects and disconnects the axially-extending annular barrel 213 of the ring gear member 210 to/from the outer annular sleeve 233 of the sun gear member 230. In exemplary embodiments, the axially-extending annular barrel 213 is located between the outer annular sleeve 233 of the sun gear member 230 and the planetary axis 201.

The arrangement of the structure of the transmission system 1000 in torque path 22 as shown in FIG. 4, provides for a neutral state, a park state and two torque transmitting speeds: when clutch 180 is open and clutch 190 is open, the planetary gearset 200 may be considered to be in "neutral gear", and no torque may be transmitted through the planetary gearset 200; when clutch 180 is open and clutch 190 is closed, the planetary gearset 200 may be considered to be in "direct gear" in which the planetary gearset 200 is not contributing any torque ratio to the drive unit ratio; when clutch 180 is closed and clutch 190 is open, the planetary gearset 200 may be considered to be in "first gear", with a higher gear ratio, in which the planetary gearset 200 provides more output torque as compared to the direct gear state; and when clutch 180 is closed and clutch 190 is closed, the planetary gearset 200 would be locked up, appropriate when a "park" condition is desired.

In certain embodiments, the transmission system 1000 may be provided without a ring-sun synchronizing clutch 190 between the ring gear member 210 and the sun gear member 230. Such a transmission system 1000 may be a 3-axis, 1-speed transmission system. Specifically, without the ring-sun synchronizing clutch 190, the planetary gearset 200 has only two states: "neutral gear" when clutch 180 is open, and "first gear", with a higher gear ratio, in which the planetary gearset 200 provides more output torque as compared to the direct gear state, when clutch 180 is closed. No direct gear state is provided when the transmission system 1000 does not include the ring-sun synchronizing clutch 190.

Cross-referencing FIGS. 2, 3, and 4 it may be seen that the transmission system 1000 is a 4-speed, 4-axis transmission system.

While FIGS. 2-4 illustrate one embodiment for each torque path 20, it is contemplated that either or both torque paths 21 and 22 may be arranged differently. For example, FIGS. 5-10 provide additional embodiments of torque paths 20 from a drive unit 100 to an output gear 140 in a transmission system 1000. Embodiments herein may combine two embodiments of torque paths 20 in a double torque path transmission system 1000, or may include only one torque path 20 in a single torque path transmission system 1000.

Figure 5:
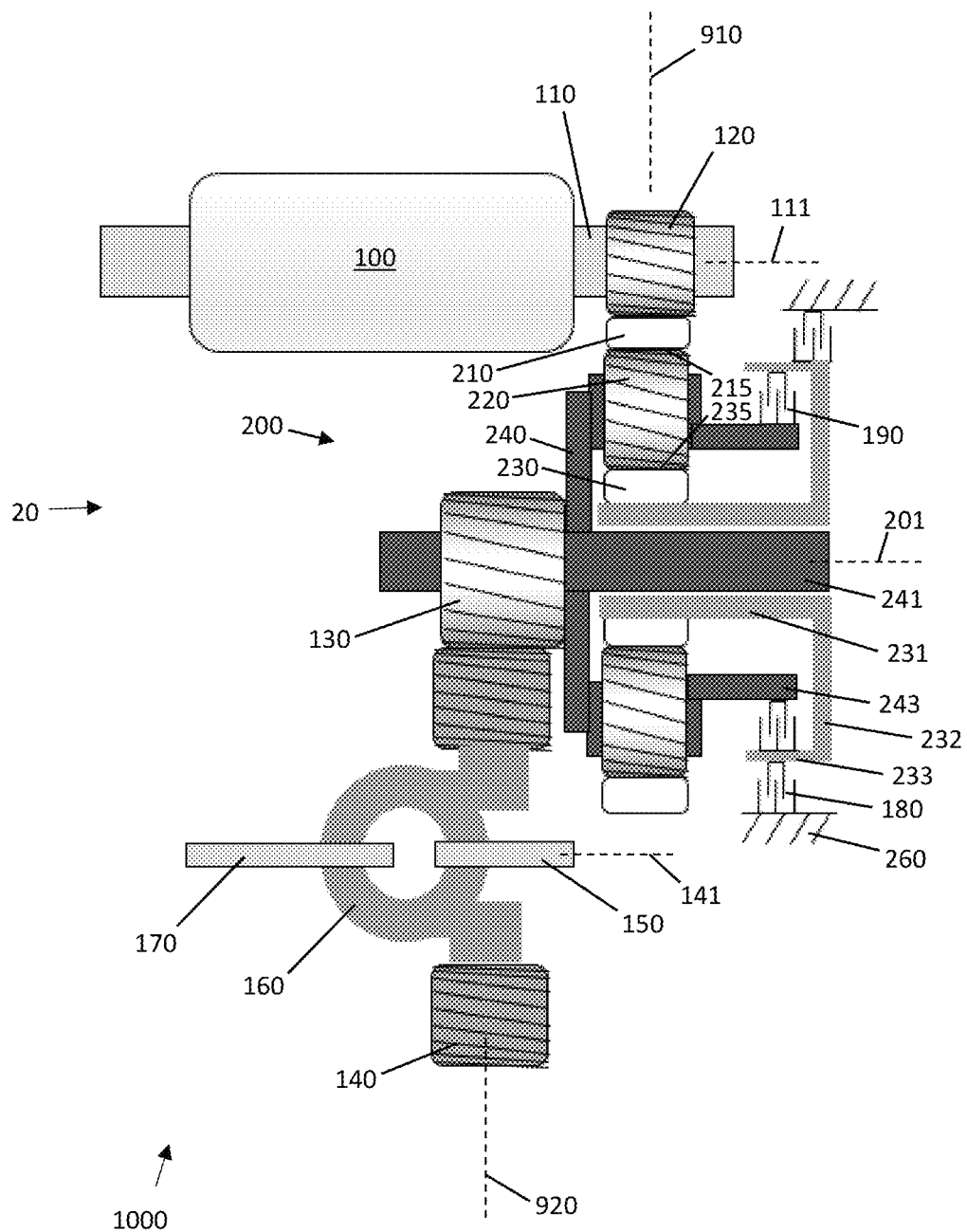

Referring to FIG. 5, an exemplary embodiment of compact transmission system 1000 is illustrated. The transmission system 1000 of FIG. 5 may be a 3-axis, 2-speed transmission system.

As shown, the transmission system 1000 includes a drive shaft 110. The drive shaft 110 is coupled to the drive unit 100. Specifically, the drive shaft 110 is configured to be powered by the drive unit 100. The drive shaft 110 defines a drive axis 111.

The exemplary transmission system 1000 further includes a drive pinion gear 120. The drive pinion gear 120 is coupled to the drive shaft 110 for rotation about the drive axis 111. The drive pinion gear 120 is configured to transfer torque from the drive shaft 110 to the planetary gearset described below.

As shown, the transmission system 1000 includes a planetary gearset 200 having a ring gear member 210, a planet gear member 220, a sun gear member 230, and a planet carrier 240 defining a planetary axis 201. As shown, the planetary axis 201 is distanced from or offset from, i.e., not co-linear with, the drive axis 111. Rather, in exemplary embodiments, the planetary axis 201 is parallel to the drive axis 111.

Each planet gear member 220 is rotatably mounted to the planet carrier 240. As shown, the planet carrier 240 includes a carrier shaft 241 that extends along axis 201. Further, the planet carrier 240 includes a brace member 242 that extends laterally, i.e., in a direction perpendicular to the planetary axis 201, from the carrier shaft 241 to planet gear members 220. Also, the planet carrier 240 includes an outer annular sleeve 243 that extends in the axial direction. The planet carrier 240 is configured to rotate about the planetary axis 201.

The exemplary sun gear member 230 includes an annular axial sleeve 231 that surrounds the carrier shaft 241, a radially-outward-extending frame 232, and an outer annular lip 233, as shown.

In the planetary gearset 200, the ring gear member 210, the sun gear member 230, and the planet carrier 240 are configured to rotate about the planetary axis 201, and the planet gear members 220 are configured to revolve about the planetary axis 201. Further, the ring gear member 210 is formed as an annular wall with cut gear teeth along an inner surface 215, and the sun gear member 230 is provided with cut gear teeth along an outer surface 235. Planet gear members 220 are rotatably mounted on the planet carrier 240 and are located between the inner surface 215 of the ring gear member 210 and the outer surface 235 of the sun gear member 230 in meshing relationship with both the sun gear member 230 and the ring gear member 210.

In the embodiment of FIG. 5, the ring gear member 210 is configured to transfer torque to the planet gear members 220. While the cross-sectional views the Figures herein illustrate two separate planet gear members 220, the transmission system 1000 includes three to ten planet gear members 220 in exemplary embodiments. Revolution of the planet gear members 220 about the axis 201 causes rotation of the planet carrier 240 about the axis 201.

As shown, the transmission system 1000 includes an output pinion gear 130 configured to transfer torque from the planetary gearset 200 to an output as described below. The output pinion gear 130 is configured for rotation about the planetary axis 201. In exemplary embodiments, the output pinion gear 130 is coupled to the carrier shaft 241.

The exemplary transmission system 1000 further includes an output gear 140 and output gear shaft 150 defining an output axis 141. As shown, the output axis 141 is distanced from or offset from, i.e., not co-linear with the axes 111 and 201. Thus, the transmission system 1000 includes three axes. In exemplary embodiments, the output gear 140 is coupled to the output gear shaft 150.

In exemplary embodiments, the transmission system 1000 further includes an output shaft 170 and a differential 160 interconnecting the output gear 140 and/or shaft 150 and the output shaft 170. In exemplary embodiments, the output shaft 170 is rotatable about the output axis 141. As a result, the output gear 140 may power the output shaft 170. Specifically, torque communicated from the output pinion gear 130 to the output gear 140 causes the output gear 140 and output gear shaft 150 to rotate about the output axis 141, and such torque is selectively communicated to the output shaft 170 through the differential 160.

As described, in the transmission system 1000 of FIG. 5, the drive pinion gear 120 is configured to transfer torque from the drive shaft 110 to the planetary gearset 200, and the output pinion gear 130 is configured to transfer torque from the planetary gearset 200 to the output shaft 170. More specifically, the drive pinion gear 120 is configured to transfer torque from the drive shaft 110 to the ring gear member 210 of the planetary gearset 200, and the output pinion gear 130 is configured to transfer torque from the planet carrier 240 of the planetary gearset 200 to the output pinion gear 130.

In exemplary embodiments, the drive pinion gear 120 directly meshes with the ring gear member 210. The ring gear member 210 transfers torque from the drive pinion gear 120 to the planet gear members 220, causing the planet gear members 220 to revolve around the axis 201 (when the sun gear member 230 is locked in static configuration by the sun-ground clutch 180 described below). As a result, the planet carrier 240, the carrier shaft 241, and the output pinion gear 130 rotate above the axis 201. The output pinion gear 130 directly meshes with the output gear 140, transferring torque from the planetary gearset 200 to the output gear 140. The output gear 140 then transfers torque from the output pinion gear 130 to the output shaft 170 through the differential 160.

As shown in FIG. 5, the drive pinion gear 120 rotates about the drive axis 111 in a plane 910 perpendicular to the drive axis 111. Further, the gear members 210, 220, and 230 rotate or revolve about the planetary axis 201 and in the same plane 910, perpendicular to the planetary axis 201. As further shown the output pinion gear 130 rotates about the planetary axis 201 in an output plane 920 distanced from the plane 910. In the illustrated embodiment, the output gear 140 rotates about the axis 141 and in the output plane 920. The transmission system 1000 of FIG. 5 includes two gear planes, plane 910 and plane 920.

In exemplary embodiments, the transmission system 1000 further includes a ground clutch 180. Specifically, the ground clutch 180 is a sun-ground clutch configured to selectively connect, and disconnect, the sun gear member 230 to/from a ground element 260. As shown, the sun-ground clutch 180 selectively connects and disconnects the outer annular lip 233 of the sun gear member 230 to/from the ground element 260.

In exemplary embodiments, the transmission system 1000 further includes a synchronizing clutch 190. Specifically, the illustrated synchronizing clutch 190 is a carrier-sun synchronizing clutch configured to selectively connect, and disconnect, the planet carrier 240 to/from the sun gear member 230. As shown, the carrier-sun clutch 190 selectively connects and disconnects the outer annular sleeve 243 of the planet carrier 240 to/from the outer annular lip 233 of the sun gear member 230. In exemplary embodiments, the outer annular sleeve 243 of the planet carrier 240 is located between the outer annular lip 233 of the sun gear member 230 and the planetary axis 201.

With the arrangement of clutches 180 and 190, various operating states are provided. For example, when clutch 180 is open and clutch 190 is open, the planetary gearset 200 may be considered to be in "neutral gear", and no torque may be transmitted through the planetary gearset 200. When clutch 180 is open and clutch 190 is closed, the planetary gearset 200 may be considered to be in "direct gear" in which the planetary gearset 200 is not contributing any torque ratio to the drive unit ratio. When clutch 180 is closed and clutch 190 is open, the planetary gearset 200 may be considered to be in "first gear", with a higher gear ratio, in which the planetary gearset 200 provides more output torque as compared to the direct gear state. When clutch 180 is closed and clutch 190 is closed, the planetary gearset 200 would be locked up, appropriate when a "park" condition is desired.

As stated above, the illustrated embodiment in FIG. 5 may be referred to as a 3-axis, 2-speed transmission system, including separate axes 111, 201, and 141 of rotation of the drive shaft 110 and drive pinion gear 120, planetary gearset 200, and output gear 140, output gear shaft 150, and output shaft 170, respectively.

In other embodiments, the transmission system 1000 may be provided without a carrier-sun synchronizing clutch 190 between the planet carrier 240 and the ring gear member 210. Such a transmission system 1000 may be referred to as a 3-axis, 1-speed transmission system. Specifically, without the carrier-sun synchronizing clutch 190, the planetary gearset 200 has only two states: "neutral gear" when clutch 180 is open, and "first gear", with a higher gear ratio, in which the planetary gearset 200 provides more output torque as compared to the direct gear state, when clutch 180 is closed. No direct gear state is provided when the transmission system 1000 does not include the carrier-sun synchronizing clutch 190. In such embodiments, the planet carrier 240 may not include the outer annular sleeve 243.

Figure 6:
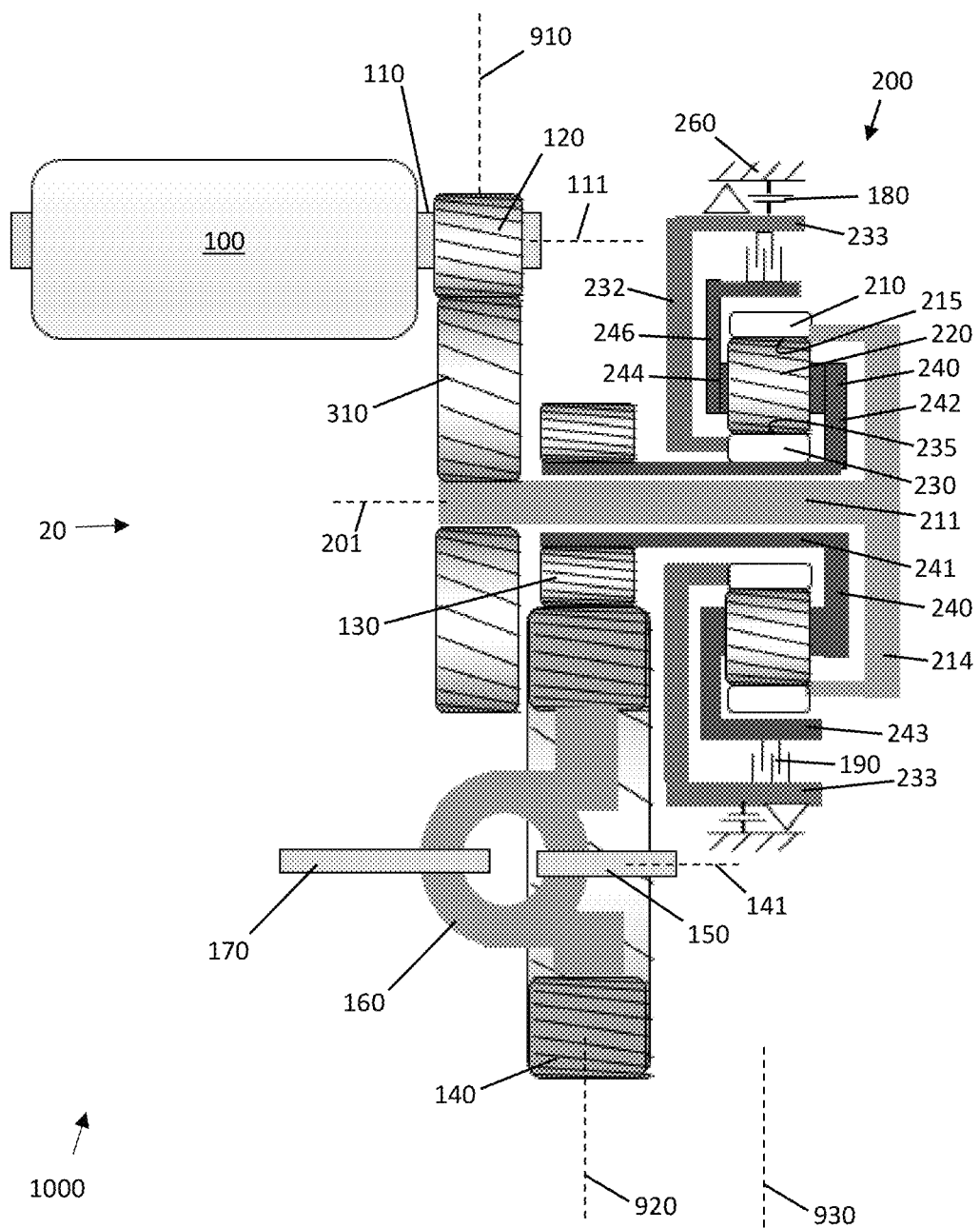

Referring now to FIG. 6, another embodiment of a transmission system 1000 is provided. The transmission system 1000 of FIG. 6 may also be referred to as a 3-axis, 2-speed transmission system.

As shown, the transmission system 1000 includes a drive shaft 110. The drive shaft 110 is coupled to the drive unit 100. Specifically, the drive shaft 110 is configured to be powered by the drive unit 100. The drive shaft 110 defines a drive axis 111.

The exemplary transmission system 1000 further includes a drive pinion gear 120. The drive pinion gear 120 is coupled to the drive shaft 110 for rotation about the drive axis 111. The drive pinion gear 120 is configured to transfer torque from the drive shaft 110 to the planetary gearset described below.

As shown, the transmission system 1000 includes a planetary gearset 200 having a ring gear member 210, a planet gear member 220, a sun gear member 230, and a planet carrier 240 defining a planetary axis 201. As shown, the planetary axis 201 is distanced from or offset from, i.e., not co-linear with, the drive axis 111. Rather, in exemplary embodiments, the planetary axis 201 is parallel to the drive axis 111.

In FIG. 6, the exemplary ring gear member 210 includes a ring gear shaft 211 that extends along axis 201. Further, the ring gear member 210 includes a brace member 214 that extends laterally, i.e., in a direction perpendicular to the planetary axis 201, and away from the ring gear shaft 211.

Each planet gear member 220 is rotatably mounted to the planet carrier 240 on a respective planet axle 244. As shown, the planet carrier 240 includes a carrier sleeve 241 that surrounds the ring gear shaft 211. Further, the planet carrier 240 includes a first brace member 242 that extends radially away from the carrier sleeve 241 to respective planet axles 244. The planet carrier 240 further includes a second brace member 246 that extends away from each respective planet axle 244 to an outer annular sleeve 243 that extends in the axial direction. The planet carrier 240 is configured to rotate about the planetary axis 201.

In FIG. 6, the exemplary sun gear member 230 rotates freely about the ring gear shaft 211 and carrier sleeve 241.

The exemplary sun gear member 230 includes a radially-outward-extending frame 232 that extends to an outer annular lip 233, as shown.

In the planetary gearset 200, the ring gear member 210, the sun gear member 230, and the planet carrier 240 are configured to rotate about the planetary axis 201, and the planet gear members 220 are configured to revolve about the planetary axis 201. Further, the ring gear member 210 is formed as an annular wall with cut gear teeth along an inner surface 215, and the sun gear member 230 is provided with cut gear teeth along an outer surface 235.

Planet gear members 220 are rotatably mounted on the planet carrier 240 and are located between the inner surface 215 of the ring gear member 210 and the outer surface 235 of the sun gear member 230 in meshing relationship with both the sun gear member 230 and the ring gear member 210.

In the embodiment of FIG. 6, the transmission system 1000 further includes a ring-transfer gear 310. An exemplary ring-transfer gear 310 rotates about the planetary axis 201. In exemplary embodiments, the ring-transfer gear 310 is coupled to the ring gear shaft 211.

In exemplary embodiments, the ring-transfer gear 310 is configured to transfer torque from the drive pinion gear 120 to the planetary gearset 200. Specifically, the drive pinion gear 120 directly meshes with the ring-transfer gear 310, which is coupled to the ring gear shaft 211.

The ring gear member 210 is configured to transfer torque to the planet gear members 220. Revolution of the planet gear members 220 about the axis 201 causes rotation of the planet carrier 240 about the axis 201.

As shown, the transmission system 1000 includes an output pinion gear 130 configured to transfer torque from the planetary gearset 200 to an output as described below. The output pinion gear 130 is configured for rotation about the planetary axis 201. In exemplary embodiments, the output pinion gear 130 is coupled to the carrier sleeve 241.

The exemplary transmission system 1000 further includes an output gear 140 and output gear shaft 150 defining an output axis 141. As shown, the output axis 141 is distanced from or offset from, i.e., not co-linear with the axes 111 and 201. Thus, the transmission system 1000 includes three axes. In exemplary embodiments, the output gear 140 is coupled to the output gear shaft 150.

In exemplary embodiments, the transmission system 1000 further includes an output shaft 170 and a differential 160 interconnecting the output gear 140 and/or shaft 150 and the output shaft 170. In exemplary embodiments, the output shaft 170 is rotatable about the output axis 141. As a result, the output gear 140 may power the output shaft 170. Specifically, torque communicated from the output pinion gear 130 to the output gear 140 causes the output gear 140 and output gear shaft 150 to rotate about the output axis 141, and such torque is selectively communicated to the output shaft 170 through the differential 160.

As described, in the transmission system 1000 of FIG. 6, the drive pinion gear 120 is configured to transfer torque from the drive shaft 110 to the planetary gearset 200, and the output pinion gear 130 is configured to transfer torque from the planetary gearset 200 to the output shaft 170. More specifically, the drive pinion gear 120 is configured to transfer torque from the drive shaft 110 to the ring-transfer gear 310, which is coupled to the ring gear shaft 211 of the ring gear member 210 of the planetary gearset 200, and the output pinion gear 130 is configured to transfer torque from the planet carrier 240 of the planetary gearset 200 to the output pinion gear 130.

Thus, in the embodiment of FIG. 6, the drive pinion gear 120 is indirectly in torque transfer relation with the ring gear member 210. The ring gear member 210 transfers torque from the drive pinion gear 120 to the planet gear members 220, causing the planet gear members 220 to revolve around the axis 201 (when the sun gear member 230 is locked in static configuration by the sun-ground clutch 180 described below). As a result, the planet carrier 240, the carrier sleeve 241, and the output pinion gear 130 rotate above the axis 201. The output pinion gear 130 directly meshes with the output gear 140, transferring torque from the planetary gearset 200 to the output gear 140. The output gear 140 then transfers torque from the output pinion gear 130 to the output shaft 170 through the differential 160.

As shown in FIG. 6, the drive pinion gear 120 rotates about the drive axis 111 in a plane 910 perpendicular to the drive axis 111. Further, the ring-transfer gear 310 rotates about the planetary axis 201 and in the same plane 910, perpendicular to the planetary axis 201. On the other hand, the gear members 210, 220, and 230 rotate or revolve about the planetary axis 201 in a plane 930, perpendicular to the planetary axis 201 and distanced from plane 910. As further shown the output pinion gear 130 rotates about the planetary axis 201 in an output plane 920 distanced from the plane 910 and from the plane 930. In the illustrated embodiment, the output gear 140 rotates about the axis 141 and in the output plane 920. In other words, the transmission system 1000 of FIG. 6 includes three planes, with the plane 920 being located between plane 910 and plane 930. In summary, the embodiment of FIG. 6 provides a transmission system 1000 including a simple planetary gearset 200 and in which the output gear plane 920 is located between the motor drive gear plane 910 and the planetary gear plane 930.

In exemplary embodiments, the transmission system 1000 further includes a ground clutch 180. Specifically, the ground clutch 180 is a sun-ground clutch configured to selectively connect, and disconnect, the sun gear member 230 to/from a ground element 260. As shown, the sun-ground clutch 180 selectively connects and disconnects the outer annular lip 233 of the sun gear member 230 to/from the ground element 260.

In exemplary embodiments, the transmission system 1000 further includes a synchronizing clutch 190. Specifically, the transmission system 1000 of FIG. 6 includes a carrier-sun synchronizing clutch 190 configured to selectively connect, and disconnect, the planet carrier 240 to/from the sun gear member 230. With the connection to the planet carrier 240, the carrier-sun synchronizing clutch 190 does not exhibit gear thrust during operation, and may be preferable for clutch control.

As shown, the carrier-sun synchronizing clutch 190 selectively connects and disconnects the axially-extending annular barrel 243 of the planet carrier 240 to/from the sun gear member 230. Specifically, the carrier-sun synchronizing clutch 190 selectively connects and disconnects the axially-extending annular barrel 243 of the planet carrier 240 to/from the outer annular sleeve 233 of the sun gear member 230. In exemplary embodiments, the axially-extending annular barrel 243 of the planet carrier 240 is located between the outer annular sleeve 233 of the sun gear member 230 and the planetary axis 201.

With the arrangement of clutches 180 and 190, various operating states are provided. For example, when clutch 180 is open and clutch 190 is open, the planetary gearset 200 may be considered to be in "neutral gear", and no torque may be transmitted through the planetary gearset 200. When clutch 180 is open and clutch 190 is closed, the planetary gearset 200 may be considered to be in "direct gear" in which the planetary gearset 200 is not contributing any torque ratio to the drive unit ratio. When clutch 180 is closed and clutch 190 is open, the planetary gearset 200 may be considered to be in "first gear", with a higher gear ratio, in which the planetary gearset 200 provides more output torque as compared to the direct gear state. When clutch 180 is closed and clutch 190 is closed, the planetary gearset 200 would be locked up, appropriate when a "park" condition is desired.

As stated above, the illustrated embodiment in FIG. 6 may be referred to as a 3-axis, 2-speed transmission system, including separate axes 111, 201, and 141 of rotation of the drive shaft 110 and drive pinion gear 120, planetary gearset 200, and output gear 140, output gear shaft 150, and output shaft 170, respectively.

In other embodiments, the transmission system 1000 may be provided without a carrier-sun synchronizing clutch 190 between the planet carrier 240 and the sun gear member 230. Such a transmission system 1000 may be referred to as a 3-axis, 1-speed transmission system. Specifically, without the carrier-sun synchronizing clutch 190, the planetary gearset 200 has only two states: "neutral gear" when clutch 180 is open, and "first gear", with a higher gear ratio, in which the planetary gearset 200 provides more output torque as compared to the direct gear state, when clutch 180 is closed. No direct gear state is possible when the transmission system 1000 does not include the carrier-sun synchronizing clutch 190. In such embodiments, the planet carrier 240 may not include the axially-extending annular barrel 243 or second brace member 246.

In the embodiments of FIGS. 2-6, torque is transferred, directly or indirectly, from the drive pinion gear to the ring gear member 210 of the planetary gearset 200, and thereafter torque is transferred from the ring gear member 210 to other components of the planetary gearset 200.

Figure 7:
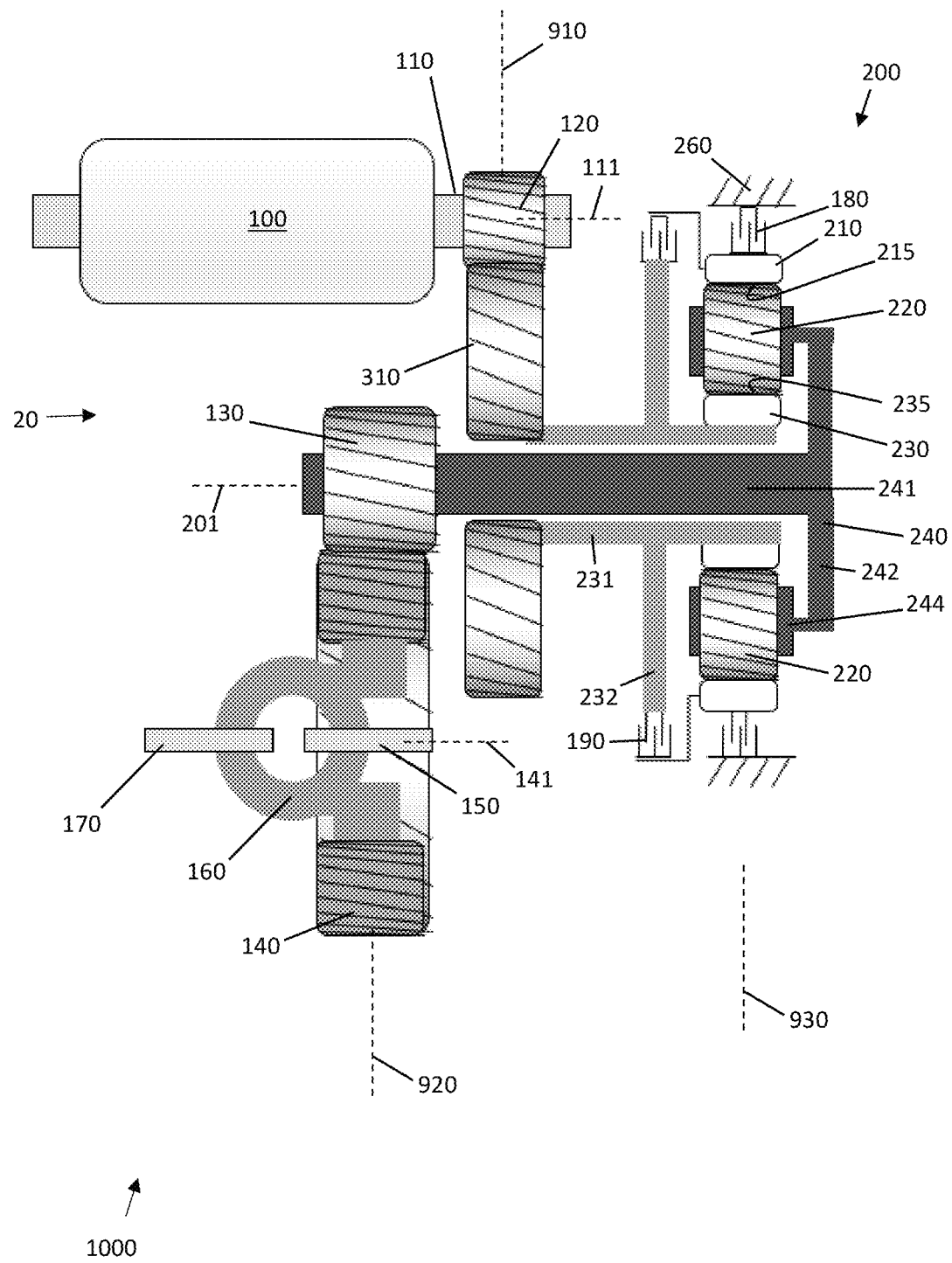

Referring now to FIG. 7, another embodiment of a transmission system 1000 is provided, in which torque is transferred from the drive pinion gear 120 to the sun gear member 230 of the planetary gearset 200, and thereafter torque is transferred from the sun gear member 230 to other components of the planetary gearset 200.

As shown, the transmission system 1000 includes a drive shaft 110. The drive shaft 110 is coupled to the drive unit 100. Specifically, the drive shaft 110 is configured to be powered by the drive unit 100. The drive shaft 110 defines a drive axis 111.

The exemplary transmission system 1000 further includes a drive pinion gear 120. The drive pinion gear 120 is coupled to the drive shaft 110 for rotation about the drive axis 111. The drive pinion gear 120 is configured to transfer torque from the drive shaft 110 to the planetary gearset described below.

As shown, the transmission system 1000 includes a planetary gearset 200 having a ring gear member 210, a planet gear member 220, a sun gear member 230, and a planet carrier 240 defining a planetary axis 201. As shown, the planetary axis 201 is distanced from or offset from, i.e., not co-linear with, the drive axis 111. Rather, in exemplary embodiments, the planetary axis 201 is parallel to the drive axis 111.

In FIG. 7, each planet gear member 220 is rotatably mounted to the planet carrier 240, such as on respective planet axles 244. As shown, the planet carrier 240 includes a carrier shaft 241 that extends along axis 201. Further, the planet carrier 240 includes a brace member 242 that extends laterally, i.e., in a direction perpendicular to the planetary axis 201, from the carrier shaft 241 to the planet axles 244. The planet carrier 240 is configured to rotate about the planetary axis 201.

The exemplary sun gear member 230 includes an annular axial sleeve 231 that surrounds the carrier shaft 241 and a radially-outward-extending frame 232, as shown. The exemplary sun gear member 230 and axial sleeve 231 rotate freely about the carrier shaft 241.

In the planetary gearset 200, the ring gear member 210, the sun gear member 230, and the planet carrier 240 are configured to rotate about the planetary axis 201, and the planet gear members 220 are configured to revolve about the planetary axis 201. Further, the ring gear member 210 is formed as an annular wall with cut gear teeth along an inner surface 215, and the sun gear member 230 is provided with cut gear teeth along an outer surface 235. Planet gear members 220 are rotatably mounted on the planet carrier 240 and are located between the inner surface 215 of the ring gear member 210 and the outer surface 235 of the sun gear member 230 in meshing relationship with both the sun gear member 230 and the ring gear member 210.

In the embodiment of FIG. 7, the sun gear member 230 is configured to transfer torque to the planet gear members 220. Revolution of the sun gear member 230 about the axis 201 causes rotation of the planet carrier 240 about the axis 201.

In the embodiment of FIG. 7, the transmission system 1000 further includes a sun-transfer gear 310. An exemplary sun-transfer gear 310 rotates about the planetary axis 201. In exemplary embodiments, the sun-transfer gear 310 is coupled to the sun gear sleeve 231.

In exemplary embodiments, the sun-transfer gear 310 is configured to transfer torque from the drive pinion gear 120 to the planetary gearset 200. Specifically, the drive pinion gear 120 directly meshes with the sun-transfer gear 310, which is coupled to the sun gear sleeve 231 for rotation about axis 201.

As shown, the transmission system 1000 includes an output pinion gear 130 configured to transfer torque from the planetary gearset 200 to an output as described below. The output pinion gear 130 is configured for rotation about the planetary axis 201. In exemplary embodiments, the output pinion gear 130 is coupled to the carrier shaft 241.

The exemplary transmission system 1000 further includes an output gear 140 and output gear shaft 150 defining an output axis 141. As shown, the output axis 141 is distanced from or offset from, i.e., not co-linear with the axes 111 and 201. Thus, the transmission system 1000 includes three axes. In exemplary embodiments, the output gear 140 is coupled to the output gear shaft 150.

In exemplary embodiments, the transmission system 1000 further includes an output shaft 170 and a differential 160 interconnecting the output gear 140 and/or shaft 150 and the output shaft 170. In exemplary embodiments, the output shaft 170 is rotatable about the output axis 141. As a result, the output gear 140 may power the output shaft 170. Specifically, torque communicated from the output pinion gear 130 to the output gear 140 causes the output gear 140 and output gear shaft 150 to rotate about the output axis 141, and such torque is selectively communicated to the output shaft 170 through the differential 160.

As described, in the transmission system 1000 of FIG. 7, the drive pinion gear 120 is configured to transfer torque from the drive shaft 110 to the planetary gearset 200, and the output pinion gear 130 is configured to transfer torque from the planetary gearset 200 to the output shaft 170. More specifically, the drive pinion gear 120 is configured to transfer torque from the drive shaft 110 to the sun-transfer gear 310, which is coupled to the sun gear sleeve 231 of the sun gear member 230 of the planetary gearset 200, and the output pinion gear 130 is configured to transfer torque from the planet carrier 240 of the planetary gearset 200 to the output pinion gear 130.

Thus, in the embodiment of FIG. 7, the drive pinion gear 120 indirectly transfers torque to the sun gear member 230. The sun gear member 230 transfers torque from the drive pinion gear 120 to the planet gear members 220, causing the planet gear members 220 to revolve around the axis 201 (when the ring gear member 210 is locked in static configuration by the ring-ground clutch 180 described below). As a result, the planet carrier 240, the carrier shaft 241, and the output pinion gear 130 rotate above the axis 201. The output pinion gear 130 directly meshes with the output gear 140, transferring torque from the planetary gearset 200 to the output gear 140. The output gear 140 then transfers torque from the output pinion gear 130 to the output shaft 170 through the differential 160.

As shown in FIG. 7, the drive pinion gear 120 rotates about the drive axis 111 in a plane 910 perpendicular to the drive axis 111. Further, the sun-transfer gear 310 rotates about the planetary axis 201 and in the same plane 910, perpendicular to the planetary axis 201. On the other hand, the gear members 210, 220, and 230 rotate or revolve about the planetary axis 201 in a plane 930, perpendicular to the planetary axis 201 and distanced from plane 910. As further shown the output pinion gear 130 rotates about the planetary axis 201 in an output plane 920 distanced from the plane 910 and from the plane 930. In the illustrated embodiment, the output gear 140 rotates about the axis 141 and in the output plane 920. Thus, the transmission system 1000 of FIG. 7 includes three planes, with the plane 910 being located between plane 920 and plane 930.

In exemplary embodiments, the transmission system 1000 further includes a ground clutch 180. Specifically, the ground clutch 180 is a ring-ground clutch configured to selectively connect, and disconnect, the ring gear member 210 to/from a ground element 260.

In exemplary embodiments, the transmission system 1000 further includes a synchronizing clutch 190. In FIG. 7, the transmission system 1000 includes a ring-sun synchronizing clutch 190 configured to selectively connect, and disconnect, the ring gear member 210 to/from the sun gear member 230.

As shown, the ring-sun synchronizing clutch 190 selectively connects and disconnects the radially-outward-extending frame 232 of the sun gear member 230 to/from the ring gear member 210.

With the arrangement of clutches 180 and 190, various operating states are provided. For example, when clutch 180 is open and clutch 190 is open, the planetary gearset 200 may be considered to be in "neutral gear", and no torque may be transmitted through the planetary gearset 200. When clutch 180 is open and clutch 190 is closed, the planetary gearset 200 may be considered to be in "direct gear" in which the planetary gearset 200 is not contributing any torque ratio to the drive unit ratio. When clutch 180 is closed and clutch 190 is open, the planetary gearset 200 may be considered to be in "first gear", with a higher gear ratio, in which the planetary gearset 200 provides more output torque as compared to the direct gear state. When clutch 180 is closed and clutch 190 is closed, the planetary gearset 200 would be locked up, appropriate when a "park" condition is desired.

As stated above, the illustrated embodiment in FIG. 7 may be referred to as a 3-axis, 2-speed transmission system, including separate axes 111, 201, and 141 of rotation of the drive shaft 110 and drive pinion gear 120, planetary gearset 200, and output gear 140, output gear shaft 150, and output shaft 170, respectively.

In other embodiments, the transmission system 1000 may be provided without a ring-sun synchronizing clutch 190 between the ring gear member 210 and the sun gear member 230. Such a transmission system 1000 may be referred to as a 3-axis, 1-speed transmission system. Specifically, without the ring-sun synchronizing clutch 190, the planetary gearset 200 has only two states: "neutral gear" when clutch 180 is open, and "first gear", with a higher gear ratio, in which the planetary gearset 200 provides more output torque as compared to the direct gear state, when clutch 180 is closed. No direct gear state is possible when the transmission system 1000 does not include the ring-sun synchronizing clutch 190. In such embodiments, the ring gear member 210 may not include the radially-outward-extending frame 232.

Figure 8:
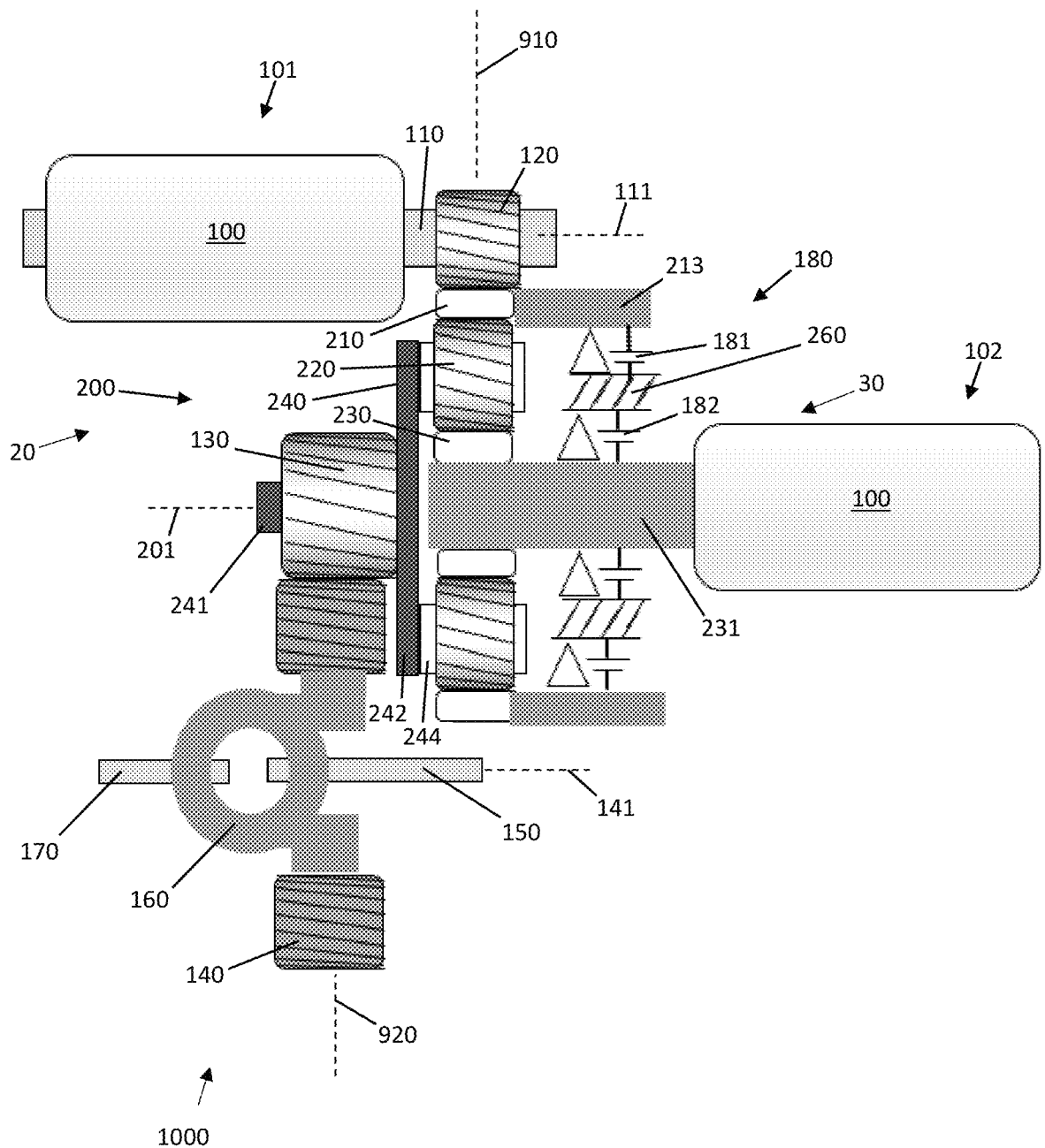

Referring now to FIG. 8, another embodiment of a transmission system 1000 is provided. In FIG. 8, the transmission system 1000 is provided for transferring torque from two drive units 100, individually numbered drive unit 101 and drive unit 102. Specifically, the transmission system 1000 provides a torque path 20 from drive unit 101 to the output gear 140 and a torque path 30 from drive unit 102 to the same output gear 140. As described below, the torque path 20 connects the drive unit 101 to the ring gear member 210 of the planetary gearset 200 and torque path 30 connects the drive unit 102 to the sun gear member 230 of the same planetary gearset 200.

The transmission system 1000 of FIG. 8 may also be referred to as a 3-axis, 3-speed transmission system.

As shown, the transmission system 1000 includes a drive shaft 110. The drive shaft 110 is coupled to the drive unit 101. Specifically, the drive shaft 110 is configured to be powered by the drive unit 101. The drive shaft 110 defines a drive axis 111.

The exemplary transmission system 1000 further includes a drive pinion gear 120. The drive pinion gear 120 is coupled to the drive shaft 110 for rotation about the drive axis 111. The drive pinion gear 120 is configured to transfer torque from the drive shaft 110 to the planetary gearset described below.

As shown, the transmission system 1000 includes a planetary gearset 200 having a ring gear member 210, a planet gear member 220, a sun gear member 230, and a planet carrier 240 and defining a planetary axis 201. As shown, the planetary axis 201 is distanced from or offset from, i.e., not co-linear with, the drive axis 111. Rather, in exemplary embodiments, the planetary axis 201 is parallel to the drive axis 111.

In FIG. 8, the exemplary ring gear member 210 includes an axially-extending annular barrel 213. Further, the exemplary sun gear member 230 includes a sun gear shaft 231 that rotates about axis 201.

Each planet gear member 220 is rotatably mounted to the planet carrier 240 on a respective planet axle 244. As shown, the planet carrier 240 includes a carrier shaft 241 that extends along axis 201. Further, the planet carrier 240 includes a brace member 242 that extends laterally, i.e., in a direction perpendicular to the planetary axis 201, from the carrier shaft 241 to respective planet axles 244. The planet carrier 240 is configured to rotate about the planetary axis 201.

In the planetary gearset 200, the ring gear member 210, the sun gear member 230, and the planet carrier 240 are configured to rotate about the planetary axis 201, and the planet gear members 220 are configured to revolve about the planetary axis 201. Further, the ring gear member 210 is formed as an annular wall with cut gear teeth along an inner surface, and the sun gear member 230 is provided with cut gear teeth along an outer surface.

Planet gear members 220 are located between the inner surface of the ring gear member 210 and the outer surface of the sun gear member 230 in meshing relationship with both the sun gear member 230 and the ring gear member 210.

In the embodiment of FIG. 8, the ring gear member 210 is configured to transfer torque to the planet gear members 220. Revolution of the planet gear members 220 about the axis 201 causes rotation of the planet carrier 240 about the axis 201.

As shown, the transmission system 1000 includes an output pinion gear 130 configured to transfer torque from the planetary gearset 200 to an output as described below. The output pinion gear 130 is configured for rotation about the planetary axis 201. In exemplary embodiments, the output pinion gear 130 is coupled to the carrier shaft 241.

The exemplary transmission system 1000 further includes an output gear 140 and output gear shaft 150 defining an output axis 141. As shown, the output axis 141 is distanced from or offset from, i.e., not co-linear with the axes 111 and 201. Thus, the transmission system 1000 includes three axes. In exemplary embodiments, the output gear 140 is coupled to the output gear shaft 150.

In exemplary embodiments, the transmission system 1000 further includes an output shaft 170 and a differential 160 interconnecting the output gear 140 and/or shaft 150 and the output shaft 170. In exemplary embodiments, the output shaft 170 is rotatable about the output axis 141. As a result, the output gear 140 may power the output shaft 170. Specifically, torque communicated from the output pinion gear 130 to the output gear 140 causes the output gear 140 and output gear shaft 150 to rotate about the output axis 141, and such torque is selectively communicated to the output shaft 170 through the differential 160.

As described, in the transmission system 1000 of FIG. 8, the drive pinion gear 120 is configured to transfer torque from the drive shaft 110 to the planetary gearset 200, and the output pinion gear 130 is configured to transfer torque from the planetary gearset 200 to the output shaft 170. More specifically, the drive pinion gear 120 is configured to transfer torque from the drive shaft 110 to the ring gear member 210 of the planetary gearset 200, and the output pinion gear 130 is configured to transfer torque from the planet carrier 240 of the planetary gearset 200 to the output pinion gear 130.

Thus, in the embodiment of FIG. 8, the drive pinion gear 120 is directly connected to the ring gear member 210. The ring gear member 210 transfers torque from the drive pinion gear 120 to the planet gear members 220, causing the planet gear members 220 to revolve around the axis 201 (when the sun gear member 230 is locked in static configuration by the sun-ground clutch 180 or powered as described below). As a result, the planet carrier 240, the carrier sleeve 241, and the output pinion gear 130 rotate above the axis 201. The output pinion gear 130 directly meshes with the output gear 140, transferring torque from the planetary gearset 200 to the output gear 140. The output gear 140 then transfers torque from the output pinion gear 130 to the output shaft 170 through the differential 160.

As shown in FIG. 8, the drive pinion gear 120 rotates about the drive axis 111 in a plane 910 perpendicular to the drive axis 111. Further, the gear members 210, 220, and 230 rotate or revolve about the planetary axis 201 in the same plane 910. As further shown the output pinion gear 130 rotates about the planetary axis 201 in an output plane 920 distanced from the plane 910. In the illustrated embodiment, the output gear 140 rotates about the axis 141 and in the output plane 920. In other words, the transmission system 1000 of FIG. 8 includes two planes.

As referenced above, the exemplary transmission system 1000 of FIG. 8 is further provided with a second drive unit 100, drive unit 102. As shown, the sun gear shaft 231 is coupled to the drive unit 102. Specifically, the sun gear shaft 231 is configured to be powered by the drive unit 102.

In exemplary embodiments, the transmission system 1000 further includes a ground clutch 180 for the drive unit 101. Such ground clutch 180 is further identified by reference number 181 and may be a ring-ground clutch 181. The ring-ground clutch 181 is configured to selectively connect, and disconnect, the ring gear member 210 to/from a ground element 260. As shown, the ring-ground clutch 181 selectively connects and disconnects the axially-extending annular barrel 213 of the ring gear member 210 to/from the ground element 260.

In exemplary embodiments, the transmission system 1000 further includes a ground clutch 180 for the drive unit 102. Such ground clutch 180 is further identified by reference number 182 and may be a sun-ground clutch 182. The sun-ground clutch 182 is configured to selectively connect, and disconnect, the sun gear member 230 to/from a ground element 260. As shown, the sun-ground clutch 182 selectively connects and disconnects the sun gear shaft 231 of the sun gear member 230 to/from the ground element 260.

In the illustrated embodiment of FIG. 8, the transmission system 1000 of FIG. 8 does not include a synchronizing clutch 190.

With the arrangement of clutches 181 and 182, various operating states are provided. For example, when clutch 181 is open and clutch 182 is closed, then the planetary gearset 200 transfers torque from the drive unit 101 to the output pinion gear 130. When clutch 182 is open and clutch 181 is closed, then the planetary gearset 200 transfers torque from the drive unit 102 to the output pinion gear 130. When clutch 181 is open and clutch 182 is open, then the planetary gearset 200 transfers torque from drive unit 101 and drive unit 102 to the output pinion gear 130. When clutch 181 and clutch 182 are both closed, the planetary gearset 200 would be locked up, appropriate when a "park" condition is desired.

The illustrated embodiment in FIG. 8 may be referred to as a 3-axis, 3-speed transmission system, including separate axes 111, 201, and 141 of rotation of the drive shaft 110 and drive pinion gear 120, planetary gearset 200, and output gear 140, output gear shaft 150, and output shaft 170, respectively.

In the embodiment of FIG. 8, the transmission system 1000 may be referred to as a mixed motor system in which torque from drive unit 101 may be transferred directly from the drive pinion gear 120 to the ring gear member 210 of the planetary gearset 200, and thereafter torque may be transferred from the ring gear member 210 to other components of the planetary gearset 200; or torque from drive unit 102 may be transferred directly from drive unit 102 to the sun gear shaft 231 of the sun gear member 230 of the planetary gearset 200, and thereafter torque may be transferred from the sun gear member 230 to other components of the planetary gearset 200.

Figure 9:
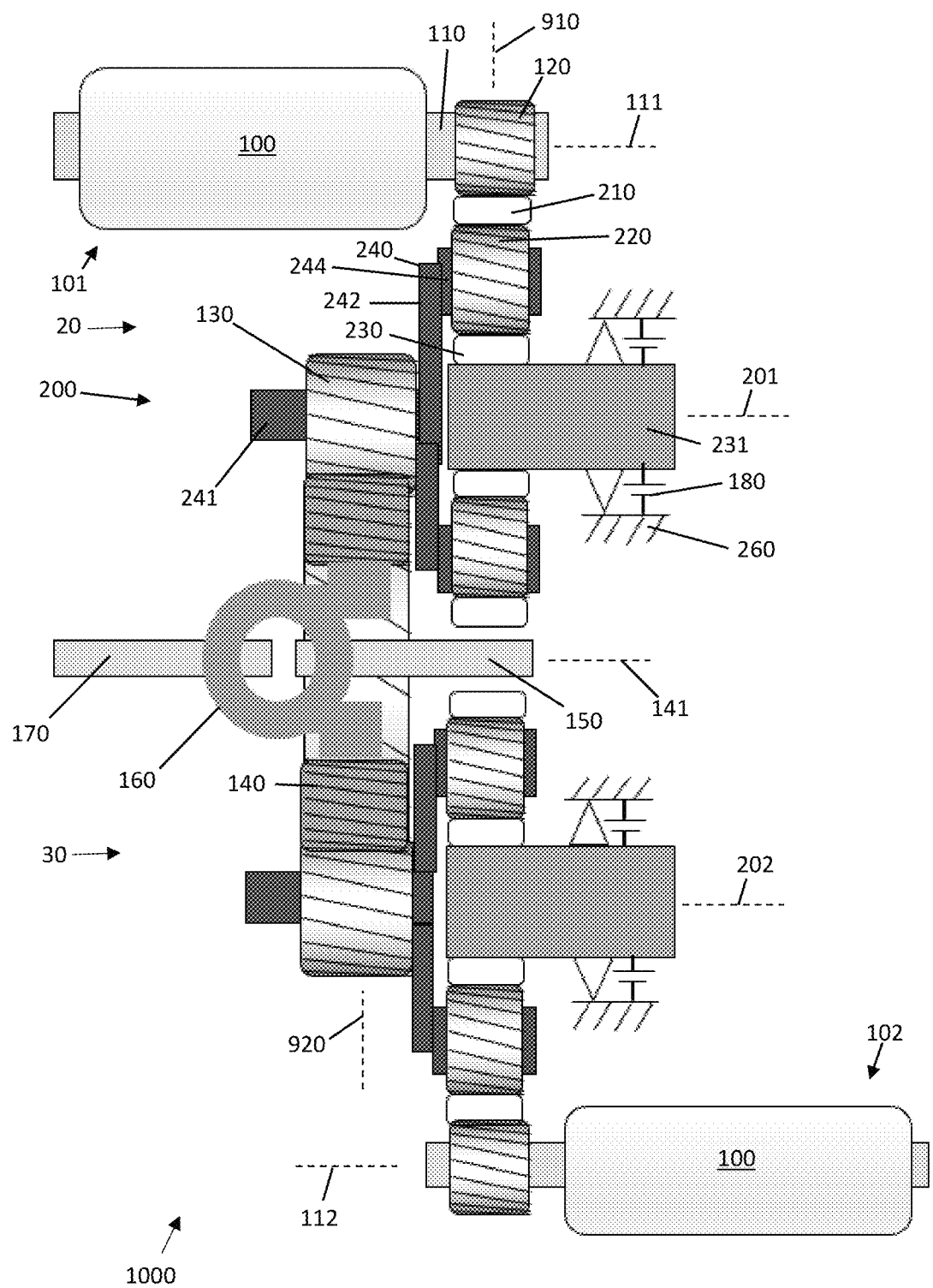

Referring now to FIG. 9, another embodiment of a transmission system 1000 is provided. In FIG. 9, the transmission system 1000 is provided for transferring torque from two drive units 100, individually numbered drive unit 101 and drive unit 102. Specifically, the transmission system 1000 provides a torque path 20 from drive unit 101 to the output gear 140 and a torque path 30 from drive unit 102 to the same output gear 140. As described below, the torque path 20 connects the drive unit 101 to the ring gear member 210 of a first planetary gearset 200 and torque path 30 connects the drive unit 102 to the ring gear member 210 of a second planetary gearset 200. Each planetary gearset 200 is provided with an output pinion gear 130. Each output pinion gear 130 is connected to the same output gear 140.

The transmission system 1000 of FIG. 9 may also be referred to as a 5-axis, 3-speed transmission system, and a dual motor, single output system.

As shown, each drive unit 101 and 102 is coupled to a respective drive shaft 110. Specifically, each drive shaft 110 is configured to be powered by the respective drive unit 101 and 102. The drive shafts 110 define drive axis 111 and drive axis 112, which are distanced from or offset from one another, i.e., not co-linear.

A respective drive pinion gear 120 is coupled to each drive shaft 110 for rotation about the respective drive axis 111 or 112. Each drive pinion gear 120 is configured to transfer torque from the respective drive shaft 110 to a respective planetary gearset described below.

As shown, each drive pinion gear 120 is connected to a respective planetary gearset 200 having a ring gear member 210, a planet gear member 220, a sun gear member 230, and a planet carrier 240 and defining a respective planetary axis 201 or 202. As shown, each planetary axis 201 and 202 is distanced from or offset from, i.e., not co-linear with, the drive axis 111 and drive axis 112. In exemplary embodiments, the axes 111, 112, 201 and 202 are parallel to one another.

In FIG. 9, each sun gear member 230 includes a sun gear shaft 231 that rotates about respective axis 201 or 202.

For each planetary gearset 200, planet gear members 220 are rotatably mounted to the respective planet carrier 240 on planet axles 244. As shown, each planet carrier 240 includes a carrier shaft 241 that extends along respective axis 201 or 202. Further, each planet carrier 240 includes a brace member 242 that extends laterally, i.e., in a direction perpendicular to the planetary axis 201 or 202, from the carrier shaft 241 to planet axles 244. Each planet carrier 240 is configured to rotate about a respective planetary axis 201 or 202.

In each planetary gearset 200, the ring gear member 210, the sun gear member 230, and the planet carrier 240 are configured to rotate about the planetary axis 201 or 202, and the planet gear members 220 are configured to revolve about the planetary axis 201 or 202. Further, each ring gear member 210 is formed as an annular wall with cut gear teeth along an inner surface, and each sun gear member 230 is provided with cut gear teeth along an outer surface.

In each planetary gearset 200, planet gear members 220 are located between the inner surface of the ring gear member 210 and the outer surface of the sun gear member 230 in meshing relationship with both the sun gear member 230 and the ring gear member 210.

In each planetary gearset 200, the respective ring gear member 210 is configured to transfer torque to the planet gear members 220. Revolution of the planet gear members 220 about the axis 201 or 202 causes rotation of the planet carrier 240 about the axis 201 or 202.

As shown, each planetary gearset 200 is connected to an output pinion gear 130 configured to transfer torque from the respective planetary gearset 200 to an output as described below. Each output pinion gear 130 is configured for rotation about the respective planetary axis 201 or 202. In exemplary embodiments, the output pinion gear 130 is coupled to the respective carrier shaft 241.

The exemplary transmission system 1000 further includes a single output gear 140 and output gear shaft 150 defining an output axis 141. As shown, the output axis 141 is distanced from or offset from, i.e., not co-linear with the axes 111, 112, 201 and 202. Thus, the transmission system 1000 includes five axes. In exemplary embodiments, the output gear 140 is coupled to the output gear shaft 150.

As shown, each output pinion gear 130 is connected to the same single output gear 140. Thus, the torque paths 20 and 30 provide power from two different drive units 101 and 102 to a single output.

In exemplary embodiments, the transmission system 1000 further includes an output shaft 170 and a differential 160 interconnecting the output gear 140 and/or shaft 150 and the output shaft 170. In exemplary embodiments, the output shaft 170 is rotatable about the output axis 141. As a result, the output gear 140 may power the output shaft 170. Specifically, torque communicated from the output pinion gears 130 to the output gear 140 causes the output gear 140 and output gear shaft 150 to rotate about the output axis 141, and such torque is selectively communicated to the output shaft 170 through the differential 160.

As described, in the transmission system 1000 of FIG. 9, each drive pinion gear 120 is configured to transfer torque from the respective drive shaft 110 to the respective planetary gearset 200, and each respective output pinion gear 130 is configured to transfer torque from the planetary gearset 200 to the output shaft 170. More specifically, each drive pinion gear 120 is configured to transfer torque from the respective drive shaft 110 to the respective ring gear member 210 of the planetary gearset 200, and the output pinion gear 130 is configured to transfer torque from the planet carrier 240 of each respective planetary gearset 200 to the respective output pinion gear 130.

Thus, in the embodiment of FIG. 9, each drive pinion gear 120 is directly connected to the respective ring gear member 210. The ring gear member 210 transfers torque from the drive pinion gear 120 to the planet gear members 220, causing the planet gear members 220 to revolve around the axis 201 (when the sun gear member 230 is locked in static configuration by the sun-ground clutch 180 as described below). As a result, the planet carrier 240, the carrier shaft 241, and the output pinion gear 130 rotate above the axis 201. Each output pinion gear 130 directly meshes with the output gear 140, transferring torque from each planetary gearset 200 to the output gear 140. The output gear 140 then transfers torque from the output pinion gears 130 to the output shaft 170 through the differential 160.

As shown in FIG. 9, the drive pinion gears 120 rotate about the respective drive axis 111 or 112 in a plane 910 perpendicular to the drive axes 111 and 112. Further, the gear members 210, 220, and 230 in each planetary gearset 200 rotate or revolve about the respective planetary axis 201 or 202 in the same plane 910. As further shown the output pinion gear 130 rotates about the respective planetary axis 201 or 202 in an output plane 920 distanced from the plane 910. In the illustrated embodiment, the output gear 140 rotates about the axis 141 and in the output plane 920. In other words, the transmission system 1000 of FIG. 9 includes two planes.

In exemplary embodiments, each path 20 and 30 of the transmission system 1000 further includes a ground clutch 180 for the respective drive unit 101 or 102. Each ground clutch 180 may be a sun-ground clutch. Each sun-ground clutch 180 is configured to selectively connect, and disconnect, the respective sun gear member 230 to/from a ground element 260. As shown, the sun-ground clutch 180 selectively connects and disconnects the sun gear shaft 231 of each sun gear member 230 to/from the ground element 260.

In the illustrated embodiment of FIG. 9, neither torque path 20 or 30 of the transmission system 1000 includes a synchronizing clutch.

With the arrangement of two torque paths 20 and 30, each provided with a clutch 180, various operating states are provided. For example, when the clutch 180 in torque path 20 is open and the clutch 180 in torque path 30 is open, then planetary gearset 200 may be in "neutral gear", and no torque may be transmitted through the planetary gearset 200 from either drive unit 100. When the clutch 180 in torque path 20 is open and the clutch 180 in torque path 30 is closed, then the planetary gearset 200 in torque path 30 transfers torque from the drive unit 102 to the output pinion gear 130 while no torque is transferred along path 20. When the clutch 180 in torque path 20 is closed and the clutch 180 in torque path 30 is open, then the planetary gearset 200 in torque path 20 transfers torque from the drive unit 101 to the output pinion gear 130, while no torque is transferred along path 30. When the clutch 180 in torque path 20 is closed and the clutch 180 in torque path 30 is closed, then the planetary gearset 200 in torque path 20 transfers torque from the drive unit 101 to the output pinion gear 130 and the planetary gearset 200 in torque path 30 transfers torque from the drive unit 102 to the output pinion gear 130.

The illustrated embodiment in FIG. 9 may be referred to as a 5-axis, 4-speed transmission system, including separate axes 111, 112, 201, 202, and 141 of rotation of the respective drive shafts 110 and drive pinion gears 120, planetary gearsets 200, single output gear 140, single output gear shaft 150, and single output shaft 170, respectively.

In the embodiment of FIG. 9, the transmission system 1000 may be a mixed motor system in which torque from drive unit 101 and/or drive unit 102 may be transferred directly from the drive pinion gear 120 to the ring gear member 210 of the respective planetary gearset 200, and thereafter torque may be transferred from the ring gear member 210 to other components of the planetary gearset 200.

Figure 10:
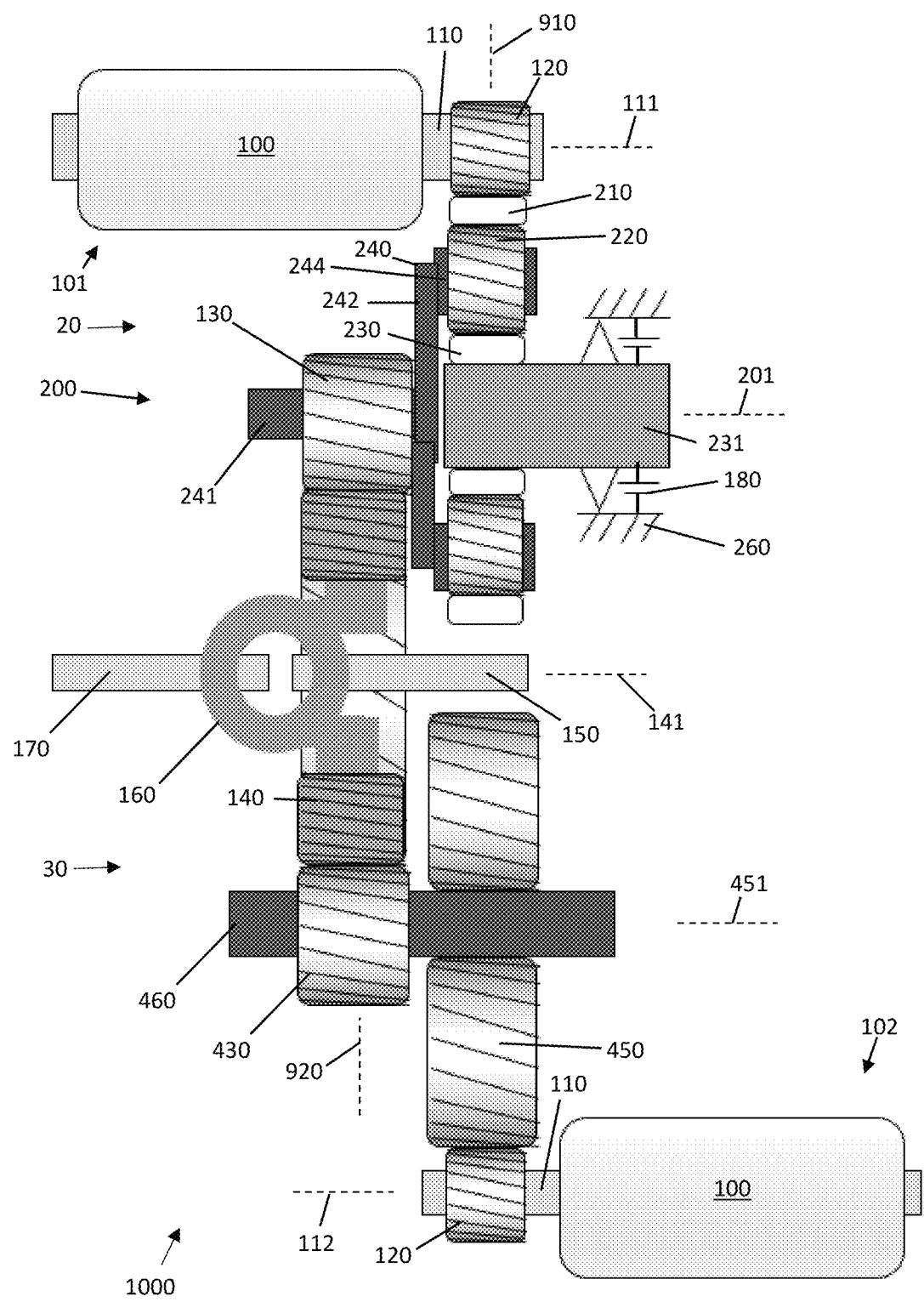

Referring now to FIG. 10, another embodiment of a transmission system 1000 is provided. In FIG. 10, the transmission system 1000 is provided for transferring torque from two drive units 100, individually numbered drive unit 101 and drive unit 102. Specifically, the transmission system 1000 provides a torque path 20 from drive unit 101 to the output gear 140 and a torque path 30 from drive unit 102 to the same output gear 140. As described below, the torque path 20 connects the drive unit 101 to the ring gear member 210 of a planetary gearset 200 that transfer torque to an output pinion gear 130. Further, torque path 30 connects the drive unit 102 to a transfer gear 450 that transfers torque to an output pinion gear 430. The output pinion gears 130 and 430 are connected to the same output gear 140.

The transmission system 1000 of FIG. 10 may also be referred to as a 5-axis, 2-speed or 3-speed transmission system, and a dual motor, single output system.

As shown, each drive unit 101 and 102 is coupled to a respective drive shaft 110. Specifically, each drive shaft 110 is configured to be powered by the respective drive unit 101 and 102. The drive shafts 110 define drive axis 111 and drive axis 112, which are distanced from or offset from one another, i.e., not co-linear.

A respective drive pinion gear 120 is coupled to each drive shaft 110 for rotation about the respective drive axis 111 or 112. The drive pinion gear 120 of torque path 20 is configured to transfer torque from the drive shaft 110 to a planetary gearset described below.

As shown, the drive pinion gear 120 in torque path 20 is connected to a planetary gearset 200 having a ring gear member 210, a planet gear member 220, a sun gear member 230, and a planet carrier 240 and defining a planetary axis 201. As shown, the planetary axis 201 is distanced from or offset from, i.e., not co-linear with, the drive axis 111 and drive axis 112. In exemplary embodiments, the axes 111, 112, and 201 are parallel to one another.

In FIG. 10, the sun gear member 230 includes a sun gear shaft 231 that rotates about axis 201.

In the planetary gearset 200, planet gear members 220 are rotatably mounted to the planet carrier 240 on planet axles 244. As shown, the planet carrier 240 includes a carrier shaft 241 that extends along axis 201. Further, planet carrier 240 includes a brace member 242 that extends laterally, i.e., in a direction perpendicular to the planetary axis 201, from the carrier shaft 241 to planet axles 244. The planet carrier 240 is configured to rotate about a respective planetary axis 201.

The ring gear member 210, the sun gear member 230, and the planet carrier 240 are configured to rotate about the planetary axis 201, and the planet gear members 220 are configured to revolve about the planetary axis 201. Further, ring gear member 210 is formed as an annular wall with cut gear teeth along an inner surface, and sun gear member 230 is provided with cut gear teeth along an outer surface.

In the planetary gearset 200, planet gear members 220 are located between the inner surface of the ring gear member 210 and the outer surface of the sun gear member 230 in meshing relationship with both the sun gear member 230 and the ring gear member 210.

In the planetary gearset 200, ring gear member 210 is configured to transfer torque to the planet gear members 220. Revolution of the planet gear members 220 about the axis 201 causes rotation of the planet carrier 240 about the axis 201.

As shown, planetary gearset 200 is connected to an output pinion gear 130 configured to transfer torque from the planetary gearset 200 to an output as described below. The output pinion gear 130 is configured for rotation about the planetary axis 201. In exemplary embodiments, the output pinion gear 130 is coupled to the carrier shaft 241.

In exemplary embodiments, the transmission system 1000 further includes a ground clutch 180 for the drive unit 101. The ground clutch 180 may be a sun-ground clutch. The sun-ground clutch 180 is configured to selectively connect, and disconnect, the sun gear member 230 to/from a ground element 260. As shown, the sun-ground clutch 180 selectively connects and disconnects the sun gear shaft 231 of the sun gear member 230 to/from the ground element 260.

In the illustrated embodiment of FIG. 10, the planetary gearset 200 does not include a synchronizing clutch. In certain embodiments, a synchronizing clutch may be provided.

As further shown in FIG. 10, the drive pinion gear 120 of torque path 30 is configured to transfer torque from the drive shaft 110 to a transfer gear 450 rotatable about an axis 451. As shown, the transfer gear 450 is connected to an output pinion gear 430, which is also rotatable about the axis 451. The output pinion gear 430 is connected to the single output gear 140. As shown, output gear 140 is rotatable about axis 141. In torque path 30, the transfer gear 450 is connected to a transfer gear shaft 460. Likewise, the output pinion gear 430 is connected to the transfer gear shaft 460.

While not shown, in certain embodiments, a clutch that selectively connects and disconnects the transfer gear 450 and the output pinion gear 430 may be provided, such as with the structure of torque path 21 in FIG. 2. As a result, when such as clutch is open, then no torque may be transferred from the drive unit 102 to the output gear 140 through torque path 30. When a clutch is provided and is closed, torque may be transferred from the drive unit 102 to the output gear 140 through torque path 30.

The transmission system 1000 of FIG. 10 includes a single output gear 140 and output gear shaft 150 defining an output axis 141. As shown, the output axis 141 is distanced from or offset from, i.e., not co-linear with the axes 111, 112, 201 and 451. Thus, the transmission system 1000 includes five axes. In exemplary embodiments, the output gear 140 is coupled to the output gear shaft 150.

As shown, both of output pinion gears 130 and 430 are connected to the same single output gear 140. Thus, the torque paths 20 and 30 provide power from two different drive units 101 and 102 to a single output.

In exemplary embodiments, the transmission system 1000 further includes an output shaft 170 and a differential 160 interconnecting the output gear 140 and/or shaft 150 and the output shaft 170. In exemplary embodiments, the output shaft 170 is rotatable about the output axis 141. As a result, the output gear 140 may power the output shaft 170. Specifically, torque communicated from the output pinion gears 130 to the output gear 140 causes the output gear 140 and output gear shaft 150 to rotate about the output axis 141, and such torque is selectively communicated to the output shaft 170 through the differential 160.

As shown in FIG. 10, the drive pinion gears 120 rotate about the respective drive axis 111 or 112 in a plane 910 perpendicular to the drive axes 111 and 112. Further, the gear members 210, 220, and 230 in the planetary gearset 200 rotate or revolve about the planetary axis 201 in the same plane 910. Also, the transfer gear 450 rotates about the transfer gear axis 451 in the same plane 910. As further shown the output pinion gears 130 and 430 rotate in an output plane 920 distanced from the plane 910. In the illustrated embodiment, the output gear 140 rotates about the axis 141 and in the output plane 920. In other words, the transmission system 1000 of FIG. 10 includes two planes.

With the arrangement of two torque paths 20 and 30, various operating states are provided. For example, in embodiments in which torque path 30 is provide with a clutch, then, when each clutch is open, the transmission system 1000 may be in "neutral gear", and no torque may be transmitted from drive units 101 or 102 to the output gear 140. When the clutch 180 in torque path 20 is open and the clutch in torque path 30 is closed (or is not provided), then torque path 30 transfers torque from the drive unit 102 to the output pinion gear 430 while no torque is transferred along path 20. When the clutch 180 in torque path 20 is closed and the clutch in torque path 30 is open, then the planetary gearset 200 in torque path 20 transfers torque from the drive unit 101 to the output pinion gear 130, while no torque is transferred along path 30. When the clutch 180 in torque path 20 is closed and the clutch 180 in torque path 30 is closed (or is not provided), then the planetary gearset 200 in torque path 20 transfers torque from the drive unit 101 to the output pinion gear 130 and the transfer gear 450 in torque path 30 transfers torque from the drive unit 102 to the output pinion gear 430.

The illustrated embodiment in FIG. 10 may be referred to as a 5-axis, 2-speed transmission system, including separate axes 111, 112, 201, 451, and 141 of rotation. In embodiments in which the torque path 30 is provided with a clutch, the transmission system 1000 may be referred to as a 5-axis, 4-speed transmission system, including separate axes 111, 112, 201, 451, and 141 of rotation.

In the embodiment of FIG. 10, the transmission system 1000 may be a mixed motor system in which torque from drive unit 101 may be transferred directly from the drive pinion gear 120 to the ring gear member 210 of the planetary gearset 200, and thereafter torque may be transferred from the ring gear member 210 to other components of the planetary gearset 200, and in which torque from drive unit 102 may be transferred directly to a transfer gear 450, and thereafter transferred to the output pinion gear 430.

As noted above, it is contemplated that a transmission system 1000 may include the components of various combinations of torque paths 20, 21, 22, and 30. For example, a transmission system 1000 may include the components of torque path 21 in FIG. 2, and the components of torque path 20 in FIG. 5. Such a combination provides a 4-axis, 3-speed transmission system including two torque paths from drive unit 100 to output gear 140. Other combinations are contemplated.

Accordingly, a number of embodiments of compact transmission systems are provided to transfer torque from a drive unit or drive units to an output.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A compact transmission comprising:
    a drive shaft defining a drive axis and configured to be powered by a drive unit;
    a planetary gearset having a ring gear member, a planet gear member, a sun gear member, and a planet carrier having a carrier shaft defining a planetary axis, wherein the planetary axis is distanced from the drive axis;
    a ring-sun synchronizing clutch configured to selectively connect the ring gear member to the sun gear member;
    an output shaft defining an output axis, wherein the output axis is distanced from the planetary axis and from the drive axis;
    an output gear connected to the output shaft;
    a drive pinion gear configured to transfer torque from the drive shaft to the planetary gearset; and
    an output pinion gear configured to transfer torque from the planetary gearset to the output shaft.

2. The compact transmission of claim 1, wherein:
    the drive pinion gear is configured to transfer torque from the drive shaft to the ring gear member of the planetary gearset; and
    the output pinion gear is configured to transfer torque from the carrier shaft to the output gear.

3. The compact transmission of claim 2, further comprising a sun-ground clutch configured to selectively connect the sun gear member to a ground element.

4. The compact transmission of claim 2, wherein the drive pinion gear meshes directly with the ring gear member of the planetary gearset.

5. The compact transmission of claim 1, further comprising:
- a second shaft defining a second axis and configured to be powered by a second gear, wherein the second axis is distanced from the output axis, from the planetary axis, and from the drive axis, and wherein the drive pinion gear is configured to transfer torque from the drive shaft to the second gear; and
- a second output pinion gear configured to transfer torque from the second shaft to the output gear.

6. The compact transmission of claim 5, further comprising a second gear clutch configured to selectively connect the second gear to the second shaft.

7. A vehicle comprising:
- a drive unit;
- a drive shaft defining a drive axis and configured to be powered by the drive unit;
- a drive pinion gear coupled to the drive shaft;
- a planetary gearset having a ring gear member, a planet gear member, a sun gear member, and a planet carrier and defining a planetary axis distanced from the drive axis, wherein the drive pinion gear is configured to transfer torque from the drive shaft to the planetary gearset;
- a ring-sun synchronizing clutch configured to selectively connect the ring gear member to the sun gear member; and
- an output shaft defining an output axis, wherein the output axis is distanced from the planetary axis and from the drive axis, and wherein the planetary gearset is configured to transfer torque from the drive pinion gear to the output shaft.

8. The vehicle of claim 7, further comprising:
- a second shaft defining a second axis and configured to be powered by a second gear, wherein the second axis is distanced from the output axis, from the planetary axis, and from the drive axis, and wherein the drive pinion gear is configured to transfer torque from the drive shaft to the second gear; and
- a second output pinion gear configured to transfer torque from the second shaft to the output gear.

9. A compact transmission comprising:
- a drive shaft defining a drive axis and configured to be powered by a drive unit;
- a planetary gearset having a ring gear member, a planet gear member, a sun gear member, and a planet carrier having a carrier shaft defining a planetary axis, wherein the planetary axis is distanced from the drive axis;
- an output shaft defining an output axis, wherein the output axis is distanced from the planetary axis and from the drive axis;
- an output gear connected to the output shaft;
- a drive pinion gear configured to transfer torque from the drive shaft to the planetary gearset;
- an output pinion gear configured to transfer torque from the planetary gearset to the output shaft;
- a second shaft defining a second axis and configured to be powered by a second gear, wherein the second axis is distanced from the output axis, from the planetary axis, and from the drive axis, and wherein the drive pinion gear is configured to transfer torque from the drive shaft to the second gear; and
- a second output pinion gear configured to transfer torque from the second shaft to the output gear.

10. The compact transmission of claim 9, further comprising a second gear clutch configured to selectively connect the second gear to the second shaft.

11. The compact transmission of claim 9, further comprising a ring-sun synchronizing clutch configured to selectively connect the ring gear member to the sun gear member.

* * * * *